United States Patent
Petry et al.

(10) Patent No.: US 8,583,787 B2
(45) Date of Patent: *Nov. 12, 2013

(54) ZERO-MINUTE VIRUS AND SPAM DETECTION

(75) Inventors: Scott M. Petry, Palo Alto, CA (US);
Shinya Akamine, Menlo Park, CA (US);
Peter K. Lund, San Francisco, CA (US);
Fred Cox, San Jose, CA (US); Michael J. Oswall, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,526

(22) Filed: Feb. 7, 2011

(65) Prior Publication Data

US 2011/0138041 A1    Jun. 9, 2011

Related U.S. Application Data

(60) Continuation of application No. 12/577,654, filed on Oct. 12, 2009, now Pat. No. 7,886,066, which is a division of application No. 11/553,306, filed on Oct. 26, 2006, now Pat. No. 7,603,472, which is a continuation of application No. 11/416,733, filed on May 3, 2006, which is a continuation of application No. 10/908,060, filed on Apr. 26, 2005, which is a continuation of application No. 10/370,118, filed on Feb. 19, 2003, now Pat. No. 6,941,348.

(51) Int. Cl.
*G06F 15/173*    (2006.01)

(52) U.S. Cl.
USPC ........... 709/224; 709/230; 709/223; 709/229; 705/40; 705/44; 713/154

(58) Field of Classification Search
USPC .............. 709/224, 230, 229; 705/40; 713/154
See application file for complete search history.

(56) References Cited

U.S. PATENT DOCUMENTS 6,487,586 B2 * 11/2002 Ogilvie et al. ................ 709/206
6,615,258 B1 * 9/2003 Barry et al. ................... 709/223

* cited by examiner

*Primary Examiner* — Tammy Nguyen
(74) *Attorney, Agent, or Firm* — Birch, Stewart, Kolasch & Birch, LLP

(57) ABSTRACT

Disclosed are systems and methods for detecting unwanted electronic message transmissions on a communications network. These include establishing a database for storing metadata associated with message traffic according to at least the source addresses of the senders of electronic message transmissions. The disclosed principles also include monitoring electronic message transmissions at the certain location on the electronic communications network. Also, included is populating the database with metadata derived from analysis of the monitored electronic messages, where the metadata includes metadata derived by analyzing the contents of the monitored electronic messages. Based upon the populated database, it is determined whether certain received electronic messages are likely to be unwanted based on an examination of the metadata associated with the source addresses of the senders of the received electronic messages and based on the analysis of the content of monitored electronic messages at least in part without reference to a promulgated database of "signatures" of known unwanted electronic messages.

28 Claims, 16 Drawing Sheets

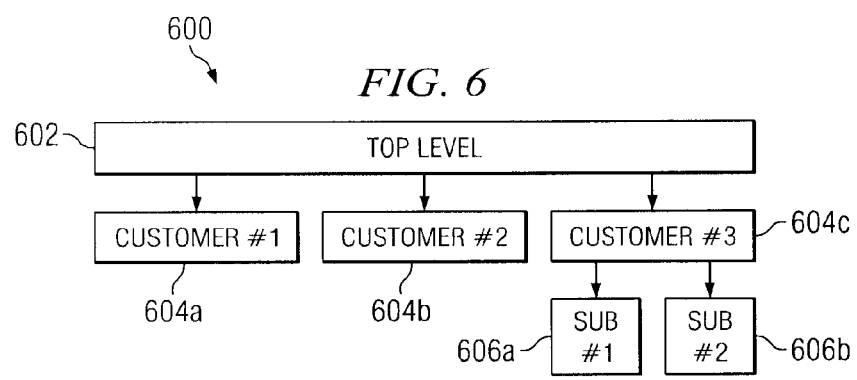
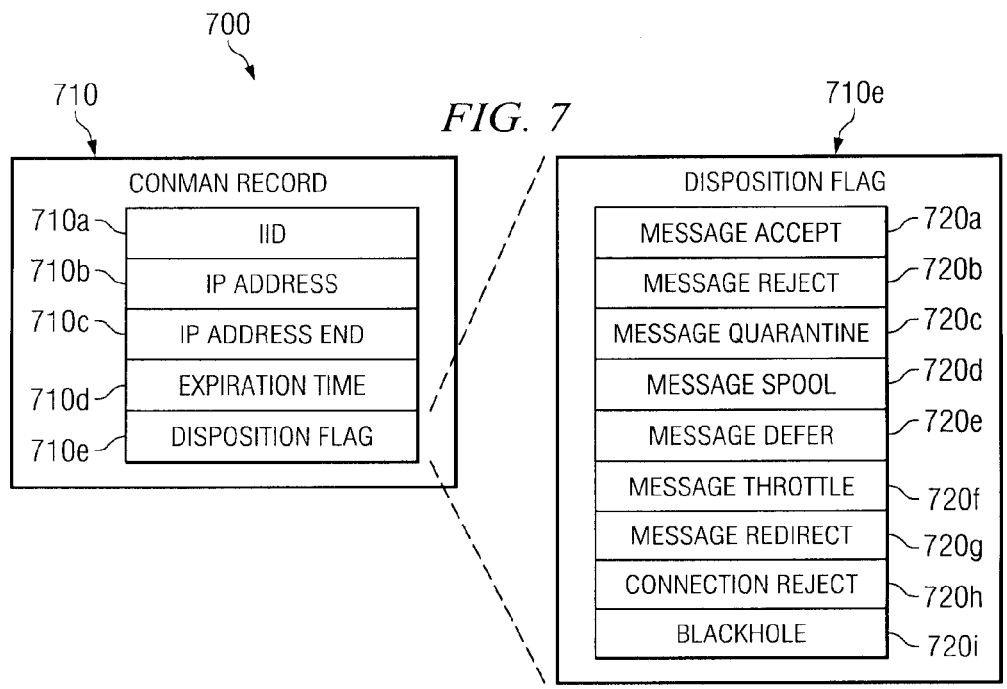

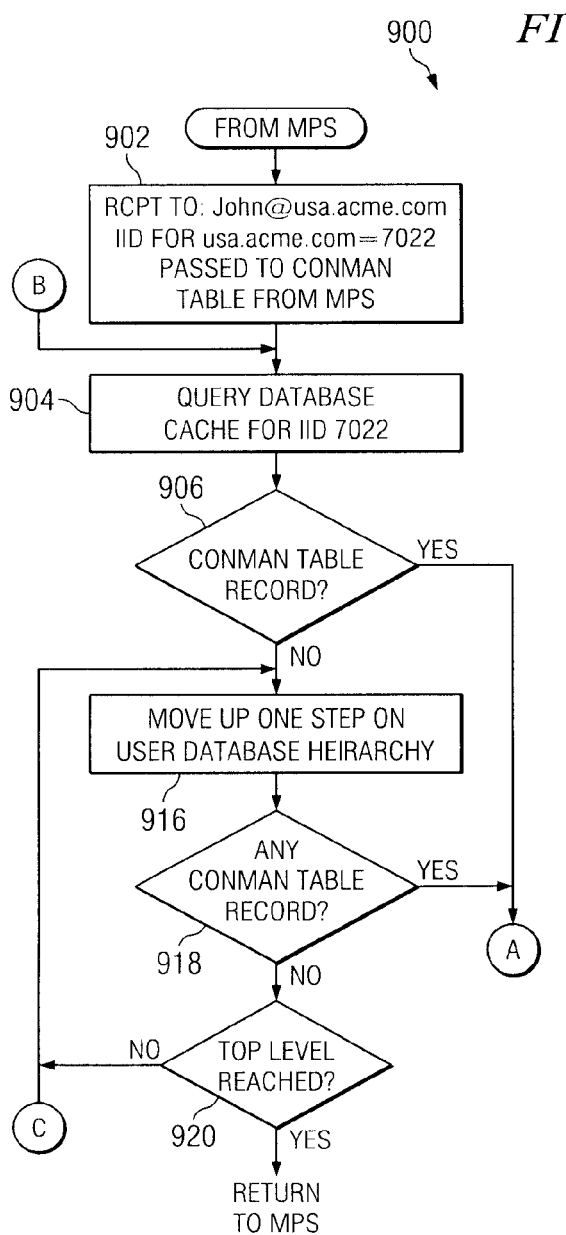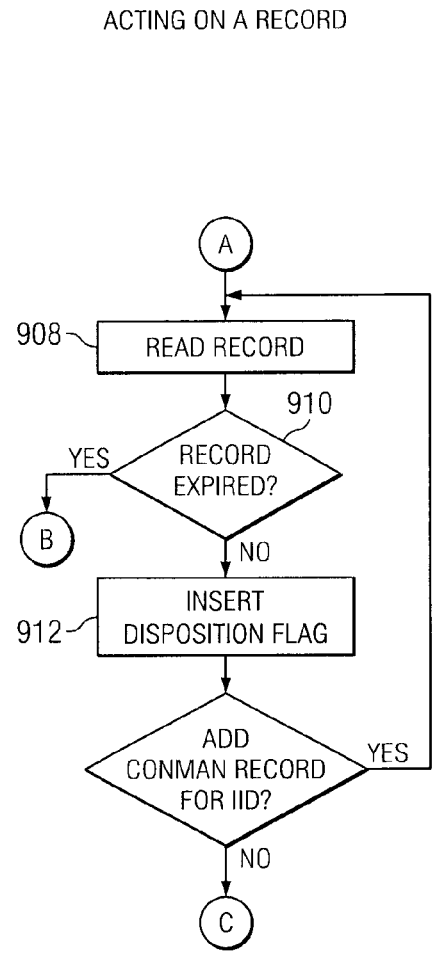
FIG. 9

ZERO-MINUTE VIRUS AND SPAM DETECTION

CROSS-REFERENCE TO RELATED APPLICATIONS

This application is a continuation application of Ser. No. 12/577,654, filed Oct. 12, 2009, which is a divisional application of U.S. patent application Ser. No. 11/553,306, filed Oct. 26, 2006, which is a continuation of U.S. patent application Ser. No. 11/416,733, filed May 3, 2006, which is a continuation of U.S. patent application Ser. No. 10/908,060, filed Apr. 26, 2005, which is a continuation of U.S. patent application Ser. No. 10/370,118, filed Feb. 19, 2003, now U.S. Pat. No. 6,941,348, which is commonly assigned with the present application and incorporated herein by reference for all purposes.

FIELD OF ACTIVITY

Disclosed embodiments herein relate generally to e-mail management systems and more particularly to e-mail management systems (EMSs) employing traffic monitoring and management to detect viruses and spam in real-time or at the "zeroeth minute."

BACKGROUND OF THE INVENTION

E-mail management is commonly handled by ISPs that have user/subscribers or by companies which employs the e-mail users. A part of e-mail management comprises filtering for spam or virus control, but when such e-mail management is performed at the ISP or at the company server location, valuable communications bandwidth and computing resources are expended on routing, analyzing, and other handling of spurious e-mail traffic. Present e-mail management systems are further characterized by a lack of real-time monitoring, feedback, and updating of rules regarding e-mail traffic or SMTP connection situations. Management and monitoring of e-mail traffic situations is commonly handled through human intervention.

Other present systems for blocking spam or viruses include systems that populate decoy email addresses around the Internet, where the decoy email addresses act as spam collectors. Human editors then review the messages that come in, catalog them, and create a database of such junk-mail messages and their checksums. The created database is then promulgated to subscribers of the service, and each message received at the customer premises is checked against the virus/spam database. Again, in this instance, the detection and monitoring of the Internet for new virus and spam messages is not in real time, and the customer premise mail server must still receive all of the spurious e-mails and then analyze all the incoming emails to see whether there is a match in the database.

In other words, prior-art approaches do not provide for immediate detection of spam and viruses before signatures of such spam and viruses are added to databases, and instead require reference to a database of junk-mail messages and/or their checksums, and neither do prior-art approaches provide for this immediate detection of spam and viruses before they are received at the customer premise mail server.

SUMMARY OF THE INVENTION

To address the above-discussed deficiencies of the prior art, the present invention provides, in one aspect, a traffic monitor for use with a computer process in managing the transmission of electronic messages from sending mail servers to receiving mail servers. In one embodiment, the traffic monitor includes a data matrix for storing the source and destination data for a plurality of incoming electronic messages, and an interface coupled to the matrix. In this embodiment, the interface is configured to facilitate supplementing of the source and destination data with metadata provided by the computer process and based on the plurality of electronic messages, and to facilitate access to the source and destination data and the metadata for use in processing the plurality of electronic messages.

In another aspect, the present invention provides a method for use with a computer process in managing the transmission of electronic messages from sending mail servers to receiving mail servers, wherein messages sent from the sending mail servers comprise source data associated with the sending mail servers and destination data associated with the receiving mail servers. In one embodiment, the method includes collecting and storing in real time, without completing the connection process, the source and destination data for a plurality of incoming electronic messages, and supplementing the source and destination data with metadata provided by the computer process and based on the plurality of electronic messages. In addition, the method includes analyzing and processing in the computer process the plurality of electronic messages based on the source and destination data and the metadata.

In one embodiment, the electronic message management system (EMS) includes a traffic monitor having a data matrix for storing the source and destination data for a plurality of incoming electronic messages, and an interface for facilitating access to the data matrix. Also, the EMS includes a message handling process coupled to the interface and configured to supplement the source and destination data with metadata extrapolated from the plurality of electronic messages. In this embodiment, the EMS still further includes an interpreter process coupled to the interface and configured to access the source and destination data and the metadata to generate processing instructions based thereon. In such an embodiment, the message handling process is further configured to process the plurality of electronic messages based on the processing instructions.

Disclosed in this application are systems and methods for detecting unwanted electronic message transmissions at a certain location on an electronic communications network. The disclosed principles include establishing a database for storing metadata associated with message traffic according to at least the source addresses of the senders of electronic message transmissions. The disclosed principles also include monitoring electronic message transmissions at the certain location on the electronic communications network. Also, included is populating the database with metadata derived from analysis of the monitored electronic messages, where the metadata includes metadata derived by analyzing the contents of the monitored electronic messages. Based upon the populated database, it is determined whether certain received electronic messages are likely to be unwanted based on an examination of the metadata associated with the source addresses of the senders of the received electronic messages and based on the analysis of the content of monitored electronic messages at least in part without reference to a promulgated database of "signatures" of known unwanted electronic messages.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the present invention, reference is now made to the following detailed description taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which:

FIG. 6 is a block diagram illustrating one embodiment for a hierarchical division of email management functions to be applied to destination IP addresses that may be managed with an EMS constructed according to the principles disclosed herein;

FIG. 7 is a database structure forming a connection management table that can be used by the connection manager to act on events in connection with a predetermined hierarchy;

FIG. 9 is a flowchart illustrating the process flow for assigning control instructions based on a sending IP address, and configuration parameters for the particular recipient in the organizational hierarchy managed by the EMS;

DETAILED DESCRIPTION OF THE EMBODIMENTS

Figure 1:
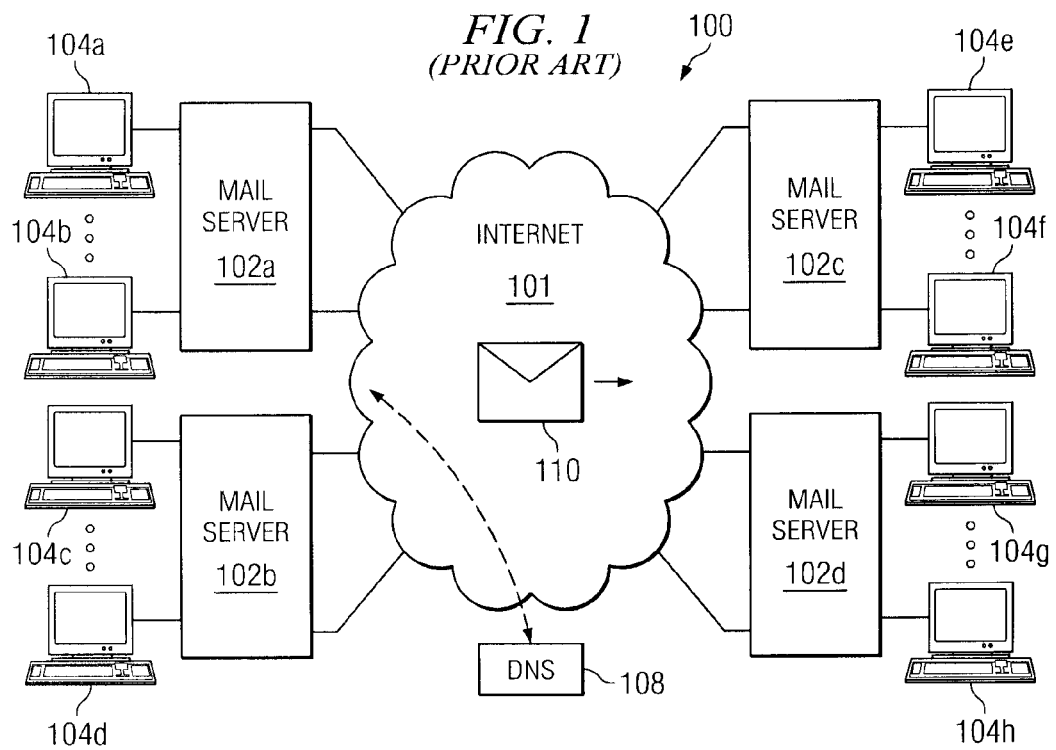
FIG. 1 is a general block diagram generally describing e-mail delivery over the Internet.

Referring initially to FIG. 1, illustrated is a prior art system 100 for the delivery of e-mail messages through the Internet 101 or other computer network. Sending mail servers 102$a$, 102$b$ (having associated source Internet protocol (IP) addresses) and receiving mail servers 102$c$, 102$d$ (having associated destination IP addresses), or other message gateways, allow electronic messages, such as electronic mails (or "e-mails") to be delivered to and from sending client machines 104$a$-104$d$ to receiving client machines 104$e$-104$h$, or other devices such as cell phones, pagers, and/or hand-held computers. In accordance with conventional systems, the transmission direction of the e-mails may also be reversed, where the sending machines and servers become the receiving machines and servers and vice versa.

E-mail messages are typically composed by an application running on a client machine 104. When composition of the message is completed, the user uploads the completed message to a mail server 102. The mail server 102 in one embodiment is owned by an Internet Service Provider (ISP) or by a private corporation for whom the user works. The user client machine 104 connects to the mail server 102 via dial-up, digital subscriber loop (DSL), cable Internet, or by other appropriate means. One standard for e-mail formats is described by RFC 822 obsoleted by RFC2822, which are a standard and a proposed standard, respectively, promulgated by Internet Engineering Task Force ("IETF"). The protocol by which e-mail messages are transmitted from sending mail server 102 to receiving mail server 102 are described by RFC821, obsoleted by RFC 2821, which are also a standard and a proposed standard, respectively, of the IETF. These standards can be found at www.ietf.org. The present disclosure hereby incorporates by reference the subject matter of the RFC 821 and RFC 822 standards and the RFC 2821 and RFC2822 proposed standards. If the proposed standards are updated from the versions published in April 2001, it is the subject matter of the April 2001 versions of these proposed standards that is hereby incorporated by reference. The RFC 821 and RFC 2821 documents describe a Simple Mail Transport Protocol ("SMTP"), which is the protocol by which e-mail messages have typically been transported over the Internet.

SMTP servers and SMTP clients (SMTP clients are network computers, not to be confused with the client machines 104) provide a mail transport service, and therefore act as Mail Transfer Agents ("MTAs"). Mail User Agents ("MUAs" or "UAs") are normally thought of as the sources and targets of mail. At the source, an MUA might be the source mail server 102$a$, 102$b$ that collects mail to be transmitted from a user and hands it off to an MTA within the network 101. The final ("delivery") MTA would be thought of as handing the mail off to an MUA, which might be the destination mail server 102$c$, 102$d$ that holds a user's mail in the user's inbox.

The SMTP mail transport protocol uses domain names to route messages from a sender to a receiver of e-mail. A distributed database of TCP/IP addresses corresponding to particular domain names is maintained across the Internet 101 in Domain Name Servers ("DNSs") 108. Thus, to route an e-mail to its destination, the source mail servers 102$a$, 102b would generally take the address specified by the sending user and inquire of a DNS server 108 the IP address to be assigned to the particular addressed domain name. As used in this specification, an "address" is a character string that identifies a user to whom mail will be sent, a user or source that is sending mail, or a location into which mail will be deposited. The term "mailbox" refers to that depository. The two terms are typically used interchangeably unless the distinction between the location in which mail is placed (the mailbox) and a reference to it (the address) is important. An address normally consists of user and domain specifications; however, addresses may have different forms depending on usage and type of address. The standard mailbox naming convention is defined to be "local-part@domain"; contemporary usage permits a much broader set of applications than simple "user names". The local part of the address is typically interpreted and assigned semantics only by the host specified in the domain part of the address. In contrast, the standard Internet Protocol (IP) address is typically a specific string of numbers identifying a source or destination server.

Once the source mail server 102a, 102b lexically identifies a domain to which email will be delivered for processing, a DNS lookup, through a DNS server 108, is performed to resolve the domain name. The email 110 is then sent from the source mail server 102a, 102b via the Internet 101 to the identified domain.

Figure 2:
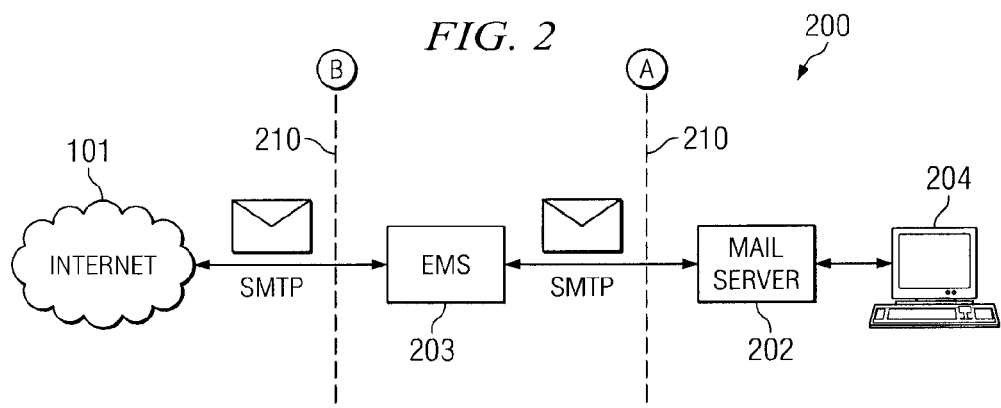
FIG. 2 is a block diagram illustrating possible placements of an active E-Mail Management System in the Internet e-mail delivery path.

Turning now to FIG. 2, illustrated is a block diagram 200 of an embodiment in which an active Electronic Message (e.g., E-Mail) Management System (EMS) 203 is provided between Internet 101 and receiving mail server 202. The EMS 203 of the present invention is "active" and automated since it is constantly managing attempted transmissions of electronic messages without the need for human intervention at various steps of the management process. In this sense, an EMS 203 according to the principles disclosed herein is automated, and configured to manage message delivery in real-time. The EMS system is able to interpret conditions, analyze patterns, and manage the delivery of data to the receiving server 202 by performing processing steps as each of the SMTP connection between the sender and recipient are processed. Traditional e-mail servers will typically accept the message data and write the message to disk prior to performing analysis. The EMS 203 is able to perform management steps at each stage of the SMTP transaction in order to minimize impact on the destination server 202, while providing security and management. So that mail intended for the mail server 202, and thus the receiving client's terminal 204, is routed through the EMS 203, the numerical IP address in the DNS 108 that is associated with the domain name of the targeted mail server 202 is updated to reflect the numerical address of the EMS 203. For example, suppose the domain name of the mail server 202 is "anywhere.com" and the numerical IP addresses for the mail server 202 and EMS 203 were "1234.5678.9876.5432" and "9876.5432.1234.5768," respectively. Then the records in the distributed DNS database 108 for "anywhere.com" would be updated to reflect the EMS's numerical address "9876.5432.1234.5768," rather than "1234.5678.9876.5432."

Although this figure shows the EMS 203 as being physically adjacent to the mail server 202, such placement is only for illustration purposes. The EMS 203 can be located anywhere on the Internet 101. It can also be located either outside or within the mail server's 202 associated firewall 210, as shown by the optional positioning of the firewall 210 at position "A" (outside the firewall) or at position "B" (inside the firewall). Alternatively, the EMS 203 could possibly run on the same physical machine as the mail server 202.

Figure 3:
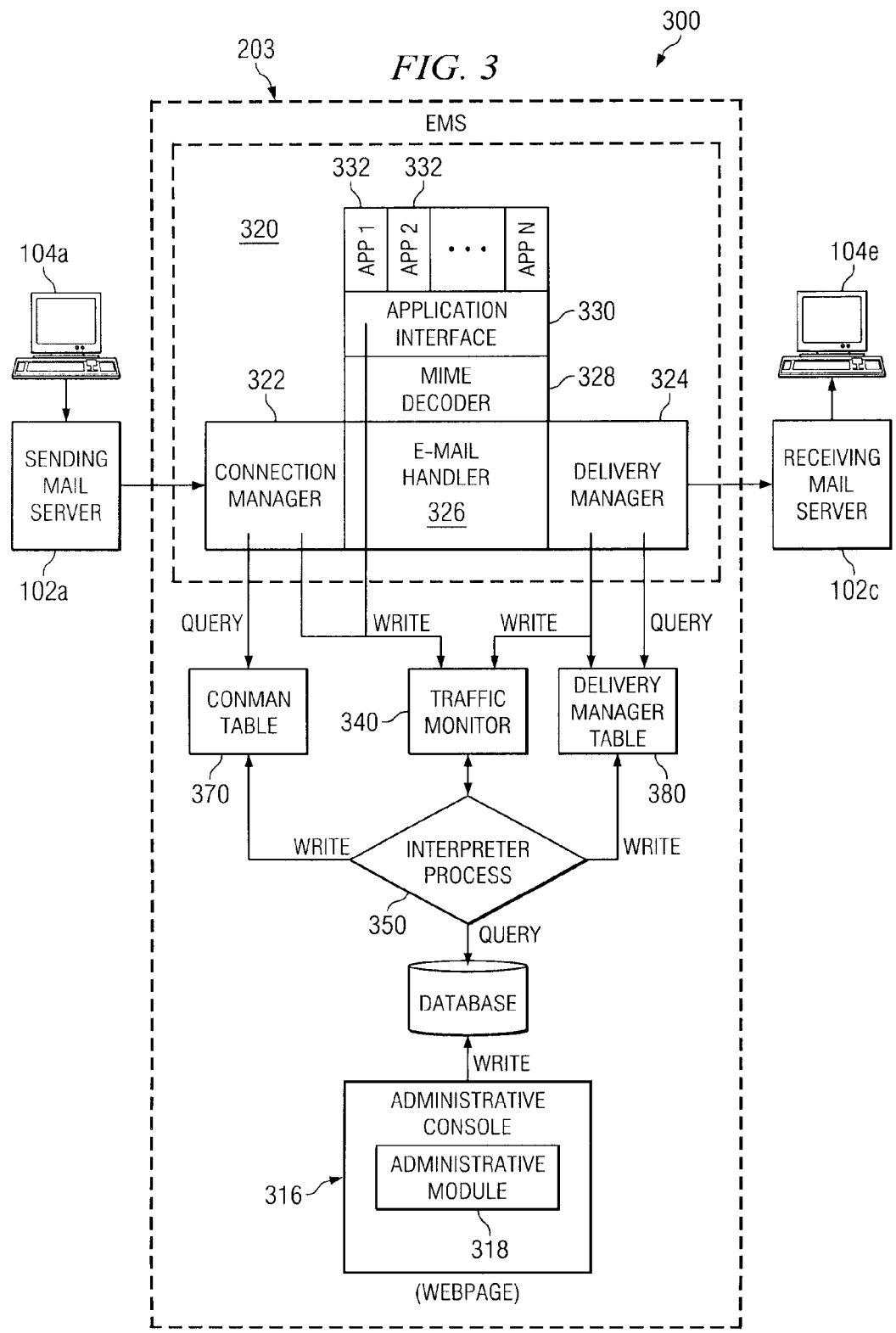
FIG. 3 is a block diagram showing in more detail the architecture and placement in an e-mail delivery network of an electronic message E-mail management system.

Looking now at FIG. 3, illustrated is a more detailed diagram, including a block diagram 300 of the EMS 203. An administrative console web page 316 (including its admin module 318), may be located on the same particular server machine as the actual EMS system 203 for providing an administrative access tool to assist in configuring how the EMS 203 processes incoming electronic messages. The connections between the EMS 203 and the mail servers 102a, 102c may be made through Internet or SMTP connections. As previously mentioned, the EMS 203 could exist inside or outside a particular firewall with or without one of the mail servers 102a, 102c.

Generally, the system shown in FIG. 3 handles mail from a "sending" mail server 102a. The designation of one mail server as a "sender" and the other as a "receiver" is arbitrary. Practically speaking, both mail servers 102a, 102c will generally act as both sender and receiver of electronic messages from and to the mail servers' 102a, 102c sending and receiving clients 104a, 104e. In the embodiment shown, at least one of the mail servers' 102a, 102c domain names will be associated with the EMS 203 in the DNS distributed database and its servers 108. In embodiments employing the administrative console 316, the console 316 receives information from the EMS 203 regarding the types of electronic messages which are coming in for particular users or groups of users, such as information regarding the suspected viruses and spam e-mails, directory harvest attacks, or unwanted content or delivery attempts that have been sent to the user or users. It is the administrative console 316 that is employed to configure the parameters of filtering to be applied by the EMS 203 for that user or organization. The administrative console 316 receives information from the EMS 203 regarding traffic patterns on the system, such as an inordinate number of e-mails being sent from a certain domain or other suspicious traffic patterns. The administrative console 316 may be a web-based application having an "admin" software module 318 running on a web server or optionally on the same intermediate platform as the EMS 203.

The EMS 203 is shown in FIG. 3 as including a message handling computer process 320 having a number of interconnected software modules. The layout of these various software modules in the message handling process 320 is not indicative of any particular physical structure in the machine running these software modules. One module included within the process 320 is a connection management module, or simply a connection manager 322. The connection manager 322 is responsible for setting up and monitoring incoming SMTP connections from UAs/mail servers 102a (or Mail Transfer Agents). The connection manager 322 is the entry point to the EMS 203, and it monitors the incoming SMTP connection attempts and e-mail messages. The process 320 is further connected to a traffic monitor 340, which collects incoming SMTP connection data, message metadata, and message delivery information.

An interpreter process 350, which may be a particular type of software daemon, is further provided. The interpreter process 350 interacts with the data in the traffic monitor 340 to recognize patterns of messages within the traffic of messages that can be acted upon. More specifically, the connection manager 322, the email handler 326, the applications 332s, and a delivery management module (or simply a delivery manager 324), all comprising portions of the process 320, write source and destination data, as well as metadata, to the traffic monitor 340 during the processing of incoming messages. The source and destination data is comprised of source data associated with the sending mail server 102a, and destination data associated with the receiving mail server 104e.

The metadata is extrapolated from the electronic messages by the process 320 using the applications 332, which are program threads for detecting unwanted messages, such as specific messages as defined by content type or size. Table 1 sets forth more detailed examples of metadata generated by the EMS 203, but the list is not intended to be exclusive.

TABLE 1

| | |
|---|---|
| frontConnections | The number of times that the source IP address has connected to the targeted organization in the last 60 seconds |
| openFrontConnections | The number of connections from this IP address to the organization currently open |
| backConnections | The number of times EMS has connected to the mailserver for the organization on behalf of this source IP address in the last 60 seconds |
| openBackConnections | As with openFrontConnections |
| backendFailed | Like backConnections, but records the number of failed connection attempts (used to detect down mail server) |
| numMessages | The number of messages which have been sent from the source IP address to users in this organization |
| numSpam | As above, but the number quarantined as spam |
| numVirus | As above, but the number quarantined as having a virus |
| conBlock, conBlackhole, conSpool, conQtine | The number of messages for which conman dispositions of block (bounce), blackhole, spool, and quarantine have been applied for the source IP address/organization pair |
| size | Message size, in bytes; mean and standard deviation |
| frontDuration | Duration of inbound connections; mean and standard deviation |
| backDuration | Duration of outbound connections; mean and standard deviation |
| numRecipients | The number of recipients on messages; mean and standard deviation |
| Errors4 | 400-class errors between source IP address/organization |
| Errors5 | 500-class errors between source IP address/organization |
| summary per org | The sum of traffic from all inbound IP addresses |
| summary record per org/mailhost | Record of when individual destination mailhosts go down |
| numAttachment | The number of messages from the source IP address with unwanted attachments |
| numContent | The number of messages from the source IP address with unwanted content |
| numDeferred | The number of temporary deferral errors from the destination IP address |
| numUnknown | The number of unknown user errors from the destination IP address |

To determine patterns with the electronic messages, or even behavior of the user sending the messages, the interpreter process 350 analyzes both the source and destination data and the metadata written into the traffic monitor 340. For example, when a large number of messages are coming in from the same outside UA mail server 102a, this might be indicative of a spam attack or other denial of service or unwanted delivery activity. The interpreter process 350 may notice such trends through patterns of the source and destination data and the metadata stored in the traffic monitor 340, and initiate actions in the mail handler 326 to block the offending e-mails. In an advantageous embodiment, the interpreter process 350 is a specific software daemon created for such tasks, but the present invention is not limited to any particular embodiment. Examples of other patterns or conditions that the interpreter process 350 may detect based on the source and destination data and the metadata include, but are not limited to:

- Directory harvest attack detection, where a statistically significant percentage of delivery attempts are directed to invalid users with the intent of compiling a list of valid addresses on the server.
- Email Bomb detection, where the same or similar message is delivered repeatedly to the same user or group of users.
- Spam Attacks, where a significant percentage of the data being sent from a source IP address is spam or otherwise unwanted e-mails.
- Virus Attacks where a significant percentage of the data being sent from a source IP address is virus-infected.
- Denial of Service connection requests, where a sending IP address is repeatedly connecting and holding the connection open or not delivering meaningful data.
- Unresponsive customer servers, where connection attempts fail and messages should be redirected or spooled.
- At-capacity customer servers, where the customer server is at threshold capacity and should not receive additional messages.
- Idle customer servers, where the idle customer servers may have unused capacity and are able to accept more messages.
- Next server, where the next e-mail server in the allocated rotation of recipient servers should receive the next message.
- Busy customer servers, where the customer server is returning a deferral error suggesting that it is unable to process requests.

A database 360 is also provided in this embodiment to log the actions of the interpreter process 350 and/or the information about the filtered e-mail, and to store configuration parameters for applying message processing actions based on patterns recognized in the traffic monitor 340. The administrative console 316 has access to the database 360 and, in turn, to the interpreter process 350, whereby the actions taken can be reviewed and the system can be configured with regard to the actions to be taken in certain types of circumstances.

Conceptually, at the other side of the process 320 is a delivery manager 324, which has the ability to know, in real time, the state of receiving UA mail servers 102c to which the EMS 203 is sending messages. Between the connection manager 322 and the delivery manager 324 is the mail handler 326, which manages the overall processes within the EMS 203. The mail handler 326 is conceptually connected to a Multipurpose Internet Mail Extensions (MIME) decoder 328 and to an application interface 330. The application interface 330 provides an interface between the mail handler 326 and applications 332, which will assist in writing information to the traffic monitor 340, which becomes the basis for the metadata.

Following a configuration established by rules stored in the database 360, the interpreter process 350 will interpret patterns in the data stored in the traffic monitor 340, as described above, and update records in a connection management table (conman table) 370. The conman table 370 stores this message processing information, typically in the form of disposition instructions, which regulate how the connection and delivery for incoming messages and for specific source IP addresses are to be processed. Examples of disposition instructions, appearing in the way of disposition flags in the records of the conman table 370, include, but are not limited to:

message accept
 message reject
 message quarantine
 message spool
 message defer
 message throttle
 message redirect
 black hole.

In one example, if one particular address is known to be spamming, or sending otherwise undesirable messages, one particular customer, a Connection Management Record (conman record) is written to the conman table 370 to reject or throttle SMTP connections, thus protecting the organization. Thus, patterns and behavior can be identified based on the source and destination data and the metadata, and connection management records can be rolled up and applied for the entire customer base. Once an offending condition has been identified, on subsequent similar requests to deliver messages, the connection manager 322 queries the conman table 370 in order to determine if there are specific instructions on handling the request from the sending IP address. If disposition flags are present, the connection manager 322 then uses the disposition instructions in the conman table 370 to dispose of the message appropriately or to prevent a connection by the sending mail server 102a in the first place. Depending on the condition preventing transmission of the message to the intended user, even if a connection by the connection manager 322 is accepted, the delivery manager 324 may be instructed by the interpreter process 350, via a delivery manager table 380, to dispose of the message appropriately. The delivery manager table 380 is similar to the conman table 370 in that the interpreter process 350 or each EMS process 203 writes message processing instructions into the table 380 based on the data stored in the traffic monitor 340. Disposition instructions that may appear in the delivery manager table 380, rather than the conman table 370, include, but are not limited to:

message deliver
 message defer
 message reject
 message redirect.

A more detailed description of some of the components of the message handler 326, as well as their function, is set forth below with reference to FIG. 4.

Figure 4:
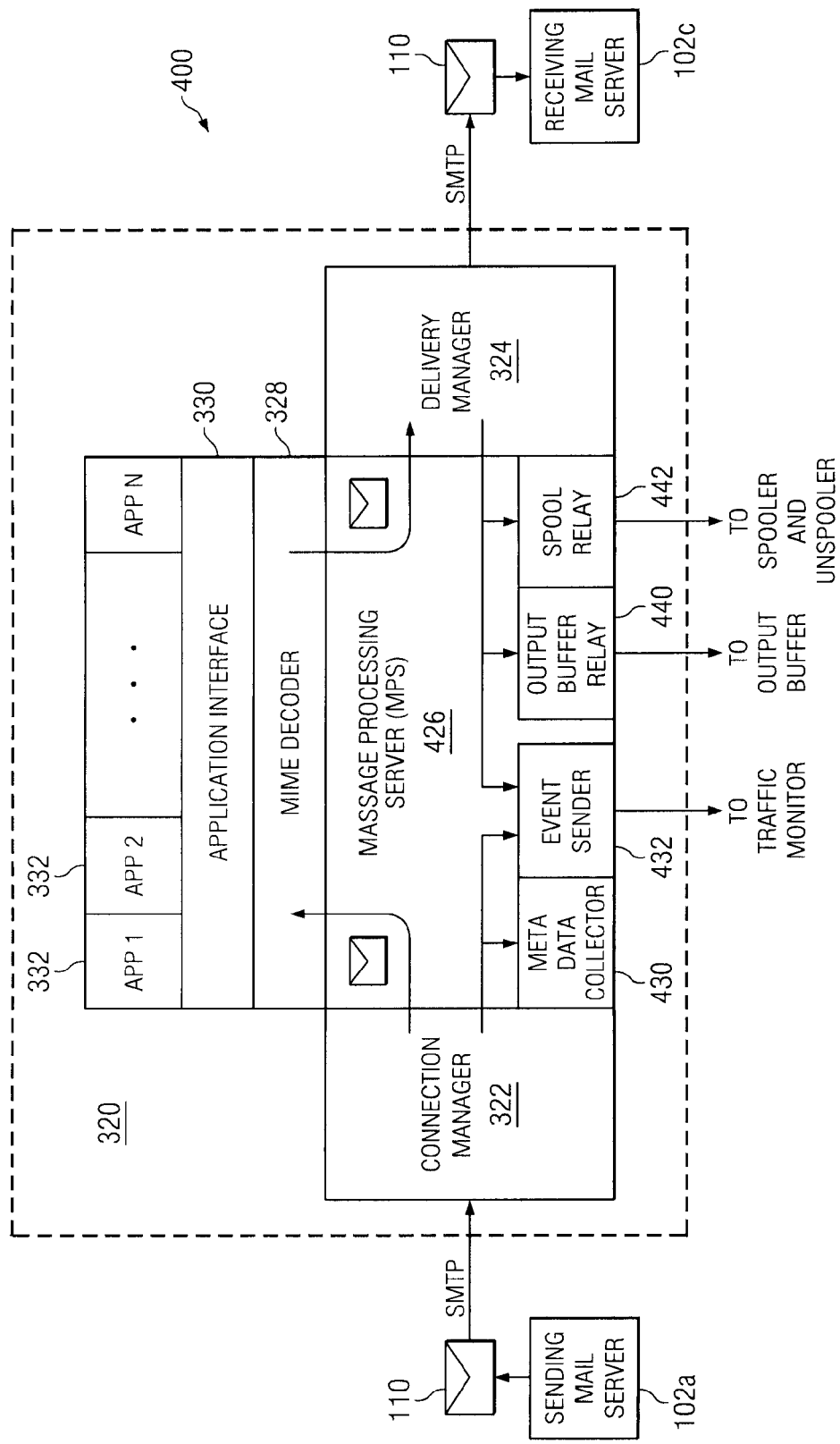
FIG. 4 is a more-focused block diagram of a message handling computer process, focusing on some of the elements of an EMS, and showing a possible routing of e-mail messages through this portion of the EMS.

Turning now to FIG. 4, illustrated is a more detailed software module block diagram 400 of the message handling computer process 320. The mail handler 326 in this embodiment includes a message processing server (MPS) 426, which is designed to be a fast, stateless mail handler. The MPS 426 takes an incoming e-mail message 110 and can "scrape" or extract information from the message 110 as it is going by, i.e., without imposing a delay on the delivery of the message 110. The MPS 426 is also able to conditionally deliver messages via the delivery manager 324, either on its own accord or according to instructions from the interpreter process 350 (see FIG. 3). For example, if the interpreter process 350 determines from the data in the traffic monitor 340 that a connection attempt or group of connection attempts from a common source IP address is a directory harvest attack, the interpreter process 350 can update the conman table 370 to instruct the connection manager 322 to reject the connection. Alternatively, the interpreter process 350 may update the delivery manager table 380 to instruct the delivery manager 324 to otherwise dispose of the message. If an application, such as a spam detection application 332, returns the value of a message that suggests it is spam, the MPS 426, in coordination with the interpreter process 350, can configure the delivery of the message to route it to a quarantine website. The decisions on which electronic messages are passed, diverted, deferred, etc. are made in part based on the metadata generated from the universe of incoming messages, and based on the way the EMS 203 has been configured through the administrative console 316 and the applications 332 selected for processing the messages.

Additional sub-modules are also shown in FIG. 4. In this embodiment, there is provided a metadata collector submodule 430 and an event sender submodule 432, which perform functions described with respect to the embodiment of FIG. 3 of collecting data from the electronic messages entering the EMS 203 and of providing that information to the traffic monitor 340. Although these submodules are shown associated with the MPS 426, they could be separate software modules or they could be associated with the metadata collector 430. While the applications 332 do not specifically write to the conman table 370, they may be configured, via the application interface 330, to: a) process the message, b) update disposition flags based on process results, and c) deliver the metadata to the traffic monitor 340.

An additional feature of the embodiments described in FIGS. 3-4 is the ability to tailor the delivery of e-mails according to the loading at the destination UA email server 102c. The deliver manager 324 can detect loading issues in the designation UA email server 102c by, for instance, delay by the server 102c in acknowledging the receipt of previous e-mail messages. Thus, the output buffer relay 440 and spool relay 442 serve to spool outgoing messages based on detected loading issues in the destination UA e-mail server 102c.

Figure 5:
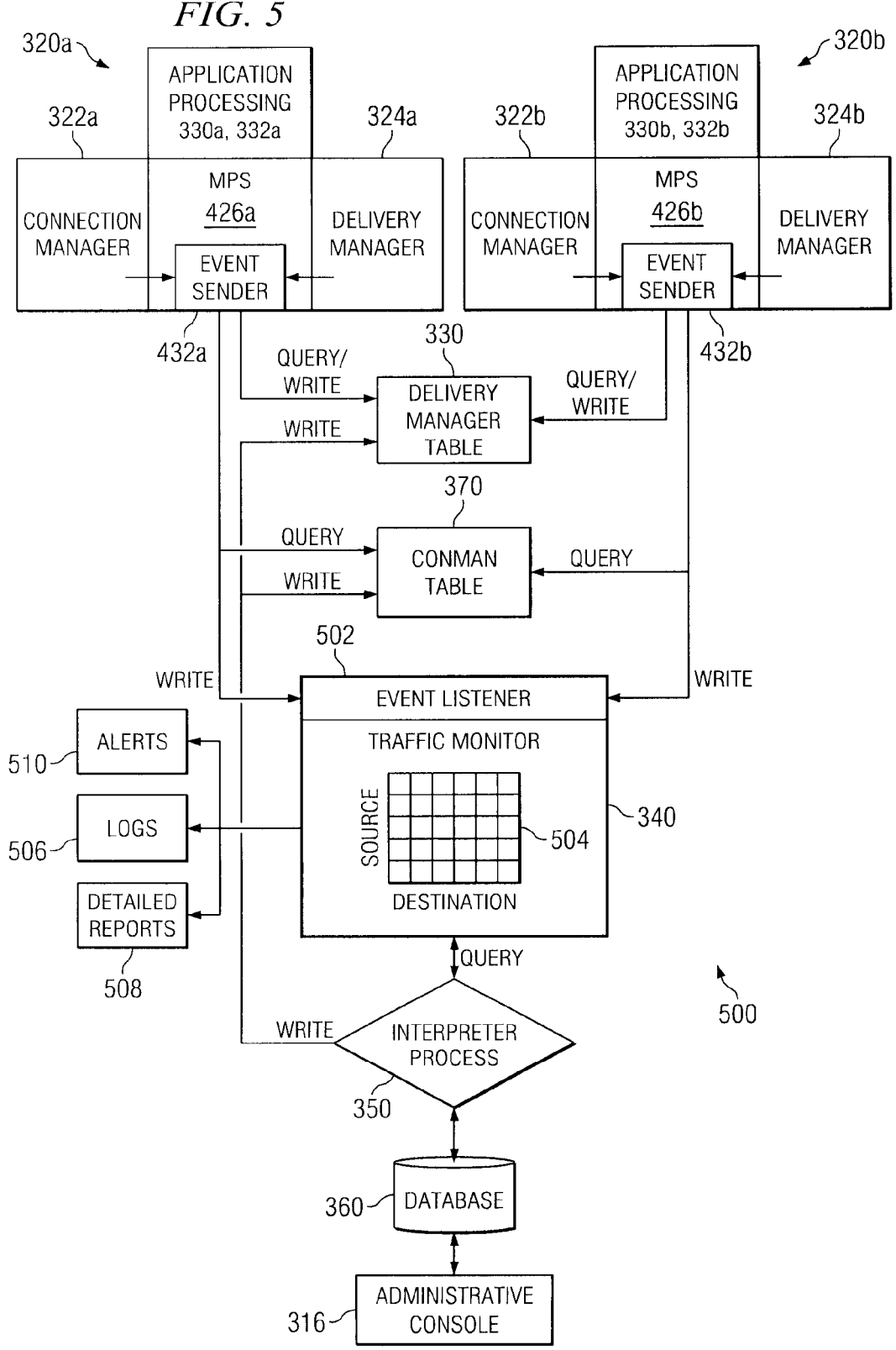
FIG. 5 is an overview of an EMS in which multiple message handling computer processes are connected to a single traffic monitor and its associated interpreter process.

Referring now to FIG. 5, illustrated is a block diagram 500 illustrating an embodiment where two or more message handling computer processes 320a, 320b are each operating independently, but are connected to a single traffic monitor 340 and conman table 370. Each process 320a-n also shares data regarding the current open connections with the receiving server. This shared delivery manager table 380 contains a current status at any time of all messages in transit to the receiving server. The processes 320a, 320b include event senders 432a, 432b, which send metadata to the traffic monitor 340 about the occurring events in the streaming e-mail traffic. The traffic monitor 340 has an event listener 502 that is the communications interface to the event senders 432a, 432b of the processes 320a, 320b. The traffic monitor 340 and interpreter process 350 in this embodiment thus monitor and control multiple processes 320a, 320b, for multiple incoming streams of electronic messages, as shown.

As an example of the organization of some of the data within the traffic monitor 340, an exemplary data matrix, in the form of a data table 504, is shown. In this data table 504, incidences of e-mails from multiple sources to multiple destinations are arranged as a table, mapping along the rows, messages from particular sources, and along the columns, messages to particular destinations. Potential spam might show up in the table 504, then, as an instance where a large percentage of the destinations have received messages from a particular source, thereby appearing as a nearly full row in the table 504. The interpreter process 350 then turns to the database 360 and consults the rules in the database 360 by which the interpreter process 350 has been instructed to operate through the configuration of those rules via the administrative console 316.

The user thus configures the interpreter process 350 through the database 360. Exemplary rules would include the definition of a spam attack (e.g., 100 or some other number of messages from a single IP address), and the actions to take on a spam attack, such as limiting the number of connections granted to the IP address or deleting all incoming e-mails from that IP address. Other examples of situations prompting the creation of message handling rules could be a virus attack, directory harvest attack, e-mail bomb, etc., as stated above. Once the rules have been stored in the database 360, all the connection managers 322a, 322b and delivery managers 324a, 324b associated with that database 360 will use the configuration information in the database 360 and the conman table 370 on each message transaction, based on the destination IP address, to ensure that they are operating under the most up-to-date set of rules. The connection managers 322a, 322b, as previously mentioned, provide event information to the traffic monitor 340 during this process.

The interpreter process 350, which monitors the traffic monitor 340, can in turn update the conman table 370 based on detected patterns in the traffic monitor 340 that violate specified rules. Modules in the computer processes 320a, 320b then connect with the database 360, the conman table 370 and the traffic monitor 340 on each message transaction to receive the most current configuration and access restrictions set forth by the rules or with the delivery manager table 380, and get instructions on delivery to the destination server based on current conditions. Thus, the system can be constantly updating itself with the most recent connection and delivery information and thereby adapt, in real-time, to changing loads of electronic message traffic, without human review or intervention. The interpreter process 350 updates the conman table 370, which is queried by all of the connection managers 322a, 322b in all of the MPSs 426a, 426b so they all simultaneously know the needed activity promulgated in the rules.

It is further possible to configure systems in which multiple delivery managers 324a, 324b and/or connection managers 322a, 322b communicate with one another, such that, for example, if one of the delivery managers 324a, 324b notices that a destination mail server is slow, a delivery manager 324a, 324b notifies all the other delivery managers 324a, 324b to defer or slow down message delivery to the particular destination server.

All transaction data is stored in Logs 506. The Logs 506 will keep records of all message transactions and parameters. In an exemplary embodiment, detailed reports 508 are generated, perhaps on a daily basis, on what servers sent what to certain destination addresses. In such an embodiment, this data may be presented in a graphical web-based format, or it may be downloaded as raw data by a user. Information on which the reports 508 may be generated include, but are not limited to, source IP address, message content type, message volume, recipient information, etc.

Alerts 510 may also be configured for informing an administrator(s) of conditions regarding their system. For example, if the EMS 203 detects a directory harvest attack, the interpreter process 350 will update the conman table 370 and generate an alert to the specified recipient. In another example, if a mail server goes down, the interpreter process 350 will update the disposition flag in the conman table 370 to spool, and generate an alert to the specified recipient. As such, Alerts 510 can be generated based on all conditions that the interpreter process 350 identifies.

In one embodiment, in accordance with FIG. 6, a user database hierarchy 600 is established whereby parameters for the identification and disposition of managing connections and scanning message data, as well as other events, can be tailored according to the position of the user within the hierarchy 600. All users within the system fall beneath the top level 602 in the hierarchy, and thus there will be established certain rules for all users in belonging to the system.

Beneath the top level 602, users may belong to subsidiary organizations, which are the customers 604a-604c to the top-level 602 administrator. For example, a user at Acme Corporation might have the e-mail address user1@acme.com, where the address acme.com is the top-level 602 domain server address associated with Acme in the distributed DNS database servers 108. E-mails would be acted upon according to the top-level 602 rules. Additionally, the specific rules of acme.com would be applied to those users, because user1 as "customer #1" 604a in the hierarchy would have set forth its particular requirements. The particular requirements of user1, however, would not be applied to the user groups associated with "customer #2" 605b or "customer #3" 604c.

Furthermore, sometimes organizations will have subsidiary organizations 606a, 606b, thus resulting in different domain name, such as corp.acme.com and usa.acme.com. The embodiments described herein allow for custom rules to also be applied at successively lower hierarchical levels without the need necessarily to implement a complete set of personalized rules for each user, although such personalization is also possible.

Turning now to FIG. 7, illustrated is a database structure 700 that can be used by a connection manager to act on events in connection with the hierarchy of FIG. 6. According to this database structure 700, conman records 710 for use in a conman table 370 are organized by an Internal Identifier ("IID") 710a, which is a record of where the recipient resides in the hierarchy 600, as well as which configuration parameters are set. Also illustrated are additional fields that can be included in the conman records 710 for the starting IP address 710b and the ending address 710c for originating IP addresses of messages. Other exemplary fields are the expiration time 710d for the conman record 710, as well as the disposition flag 710e of the conman table 370, which is the action to be taken by the connection manager 322 in response to particular connection requests.

In this embodiment, it is the interpreter process 350 that creates the conman records 710 according to rules that have been set-up for users within the organizational hierarchy 600. Alternatively, conman records 710 may also be created manually through the administrative console 316. These records 710 may be stored in the database 360 or in another database accessible by the connection manager 322. A single IID may have multiple records 710. These records 710 contain an expiration value 710d that allows blocked, throttled, or otherwise controlled sending mail servers, to retain status as legitimate senders without restriction, if their messaging practices are cleaned up. Once the expiration value 710d is reached, the connection manager 322 and MPS 426 will process individual messages from that sender. If they are continuing to send viruses, a new record 710 in the conman table 370 will be established. This process will repeat until the condition of the sender changes and they begin sending legitimate email messages.

Also illustrated in FIG. 7 is a detailed record 720*a-i* of possible disposition flags 710*e* within the conman table 370. The illustrated examples are message accept 720*a*, message reject 720*b*, message quarantine 720*c*, message spool 720*d*, message defer 720*e*, message throttle 720*f*, message redirect 720*g*, connection rejection 720*h*, and blackhole 720*i*. Of course, the invention is not limited to these specific disposition flags 710*e*.

Figure 8:
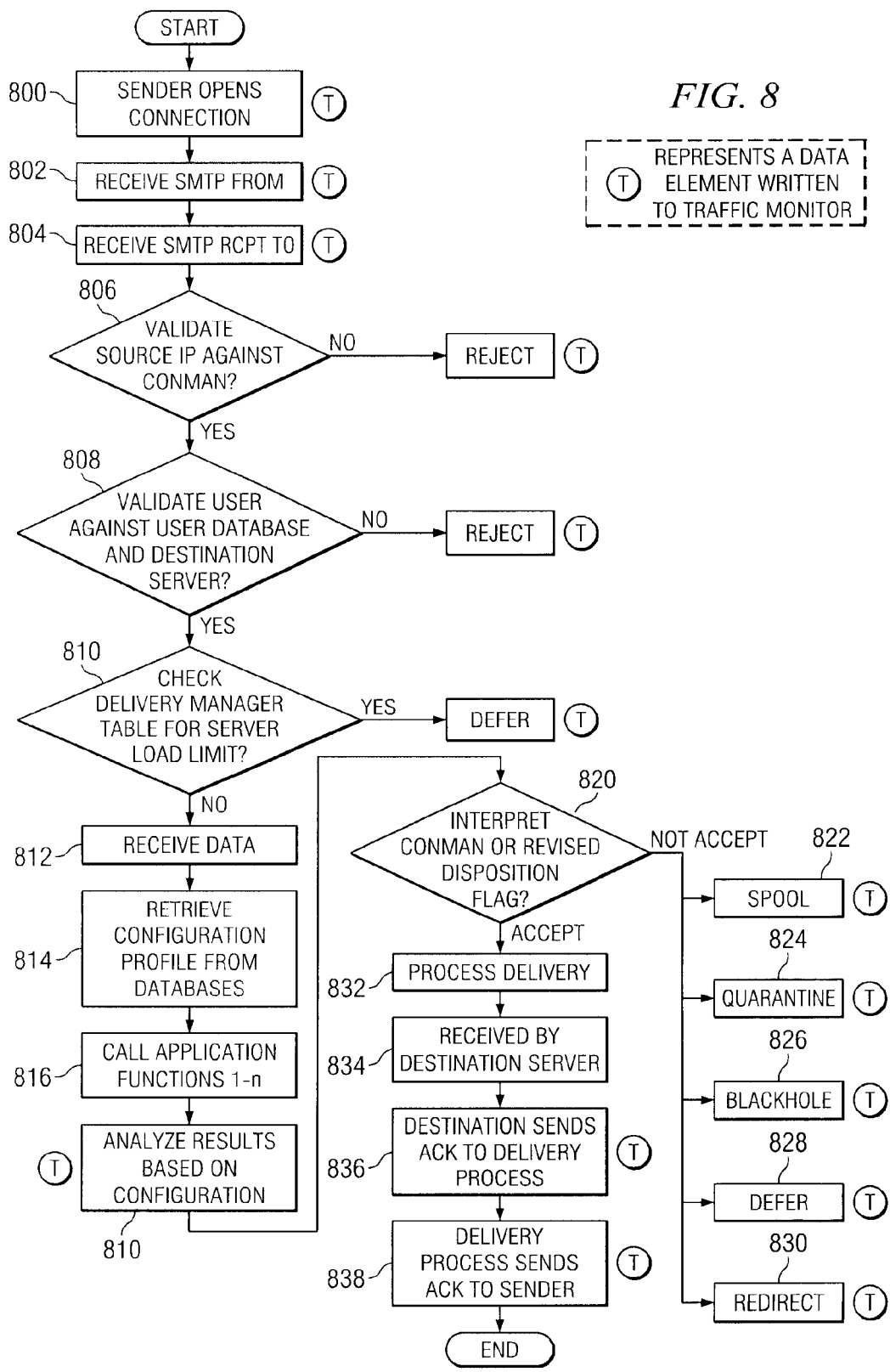
FIG. 8 is a flowchart illustrating a method for managing the transmission of electronic messages, including writing data to and receiving instructions from components of the EMS.

Referring now to FIG. 8, illustrated is one embodiment of the operation of an MPS through an operational flowchart. As indicated in the diagram, along the entire process data resulting from the process is written into a traffic monitor using various components of the MPS in the EMS, as discussed above in greater detail. That data may then be used by an interpreter process to update information in a conman table employed by a connection management module, as well as in a delivery management table employed by a delivery management module. The process begins at a start step, and then moves to step 800, where a sender opens a connection via a sender mail server in an attempt to send an electronic message, such as an e-mail, to a targeted user connected to a receiving mail server. At step 802, an EMS constructed according to the principles described herein intercepts the connection attempt by the sender, and receives information from the sender, such as SMTP information (e.g., sender's IP address).

At step 804, the EMS receives similar information, such SMTP information (e.g., the receiver's e-mail address), regarding the intended receiver of the message. Once both sets of data have been received by the EMS, the process moves to a step 806, where this data is compared with records in a connection management (conman) table. As discussed above, the records in the table may be updated by an interpreter process based on information held in the data matrix of a traffic monitor. If any blocks on transmissions from the sender have been instituted, a negative response is given at step 806 and the transmission attempt is rejected. Alternatively, if the EMS has established that all messages from a particular sender are not to be accepted, the process may move from step 802, where the sender's SMTP information is received by the EMS, to step 806, where the IP address of the sender is compared with potential disposition flags in the conman table. In this case, the transmission attempt by the sender would be rejected without the need to receive the receivers SMTP information at step 804.

At step 806, if no blocks against the sender are found in the conman table, an affirmative response is given and the process moves to step 808. At step 808, the intended recipient's information is validated against a list of users in a user database or directory, as well as a user list in a destination server directory. If the attempted transmission does not contain valid recipient information, a negative response is given at step 808 and the transmission is rejected. Also, even if a valid recipient is found in the user database, if the recipient information is not also validated against the user list in the destination server database, the transmission may be rejected. If validation from both the user database and the destination server database is obtained, an affirmation response is given and the process moves to step 810.

At step 810, a delivery manager table is queried to determine whether the intended message can be delivered to the destination server. For example, the delivery manager table may be queried to determine if the destination server is capable of receiving the transmission or has it's load limit been reached. If the destination server is not read to receive the message, an affirmation response is given at step 810 and the transmission attempt is deferred for delivery at a later time, once the destination server is ready to receive the message. If the destination server is capable of receiving the message, a negative response is given at step 810 and the process moves to a step 812. As indicated in the diagram, data regarding the sender and recipient has been written to the traffic monitor throughout this process.

At step 812, all of the data in the attempted transmission is received by the EMS, including header or other routing information, as well as the data forming the intended electronic message to be delivered. The process then moves to step 814, where the configuration profile established by rules set forth by, for example, configuration settings for the user or the organization, are read in order to determine how to process the message. At step 816, applications are employed to perform analysis of the message data to identify unwanted, prohibited or damaging messages. Metadata associated with the results of this processing is written to the traffic monitor and used by the interpreter process to determine patterns or conditions used to establish connection and delivery guidelines. Examples of the metadata created by using the applications are set forth above in Table 1.

Once the applications have completed the analysis, the process moves to step 818, where the results of the application processing are compared against the contents of the configuration database. If the results of the application processing suggest an alternate disposition flag than the flag currently available for the message, a new disposition flag is inserted. At step 820, the results from step 818 are compared to any disposition flags assigned to the message as were set forth in the conman table. If, at step 820, a disposition flag indicating the attempted transmission will not be accepted at this time, the process moves to the appropriate step corresponding with the existing disposition flag in the conman table. More specifically, if the message is to be spooled, the process moves to step 822. If the message is to be quarantined, the process moves to step 824. If the message is to be sent to a "black hole", the process moves to step 826. If the message is to be deferred, the process moves to step 828. If the message is to be redirected, the process moves to step 830.

However, if, at step 820, the records in the conman table establish that the transmission is to be accepted, the process moves to step 832. At step 832, the message is transmitted to the intended destination sever. At step 834, the message is received by the destination server. At step 836, the destination server sends an acknowledgment of receipt of the message (an "ACK") back to the EMS to acknowledge receipt of the message from the delivery manager in the EMS. Finally, at step 838, the EMS transmits an ACK of transmission back to the original sender of the message to inform the sender that the message has been transmitted to the targeted user. The process then ends.

Those who are skilled in the art will understand that the practice of the proposed process is not limited to the specific steps set forth in FIG. 8. Thus, a greater or lesser number of steps may be employed. Additionally, steps having greater or lesser detail than those illustrated in FIG. 8 may also be employed to advantage.

Turning now to FIG. 9, illustrated is a flow diagram 900 setting forth one embodiment of the procedures employed by the connection manager 322 for use in managing incoming electronic messages. More specifically, the diagram 900 illustrates assigning control instructions based on a sending IP address, and configuration parameters for the particular recipient in the organizational hierarchy managed by the EMS 203. The connection manager 322 is initiated into operation by the MPS 426, each time the MPS 426 detects a new "RCPT" command identifying a new recipient in the traffic stream. The initial operating condition of the connection manager 322 is thus shown in the diagram 900, at step 902. At step 904, the connection manager 322 queries the conman table 370 for records having an IID that corresponds to the new recipient. If, at decision block 906, it is determined that the conman table 370 contains an entry for the particular IID, control is passed to a secondary control loop in which each IID record is read (step 908), examined to see whether it is still active or expired (step 910), and acted upon (step 912). A single IID may have multiple records, and so the above actions in steps 908-912 are repeated as shown in the diagram 900, as long as there are additional records for the IID as reflected at decision block 914.

As shown in FIG. 9, a particular recipient may fit at a certain level within a hierarchy, and the particular connection actions can be tailored in this method according to each of these hierarchical levels. Accordingly, at step 916, the particular IID is examined for its membership at a next higher hierarchical level. If there are connection manager 322 records in the conman table 370 that are associated with the particular IID at this hierarchical level, then according to the flow of the process for decision step 918, the actions of the loop, steps 908-914 are repeated for all of the actions associated with the IID at the higher level. As before, once all actions associated with a given IID at this hierarchical level have been carried out, then control returns to the decision step 920, whereupon the IID relative to the hierarchical levels is examined to see whether the top hierarchical level has been reached. If the highest hierarchical level has been reached, the connection manager 322 returns control to the MPS 426.

Connections may be characterized as a pair of endpoints—sender and recipient. The connections can be managed based on the sender/recipient pair, or they may be managed based on just the recipient identifier. IP address ranges can be used to specify senders and/or recipients, and depending on the location of the indefiniteness, the ranges or indefiniteness can also be used to specify where a particular IP address belongs within a hierarchy. The IP address's membership in sets defined by certain IP address ranges can also be used to define that address's hierarchical organization memberships.

Connection management records may be inserted on a per-organization basis within the hierarchy, and they may be inherited from higher-level organizations down to lower-level organizations. As described with respect to the process flow of FIG. 9, the records can be processed in a bottom-up fashion, from a particular organization up to the root organization. When multiple records are present at a single organization, they may be processed in expire-time order, with the ones expiring at the latest date being examined first. Alternatively, they may be processed in a different order depending on how the process is defined.

Although there are many types of actions or dispositions that can be taken based on the connection requested, as discussed above, some of the common ones include the following:

ERROR: An error message is specified and passed back to the sender (e.g., "Error 501—unknown user").

QUARANTINE: The message will be quarantined under a specified reason (e.g., obscene, pornographic, or virus-infected).

BLACKHOLE: The message will appear to be delivered (i.e., a delivery confirmation is passed to the sender), but will not really go anywhere. Unless further modifications are made, another application may still cause the message to be quarantined.

ACCEPT: The message will be accepted and forwarded to the destination server. Unless further modifications are made, another application may still block the message.

SPOOL: the email server corresponding to the IID is not responsive, and therefore messages should be written to the spooler As described above, the connection manager 322 handles the accepting and making of requested connections in electronic message transactions. The dispositions described above can be implemented by the connection manager 322 by manual configuration through the administrative console 316, or they can be automatically implemented by the interpreter process 350 or another software module. As with the process of FIG. 8, the practice of the process illustrated in FIG. 9 is not limited to the specific steps set forth therein. Thus, a greater or lesser number of steps may be employed. Additionally, steps having greater or lesser detail than those illustrated in FIG. 9 may also be employed to advantage.

Figure 10A:
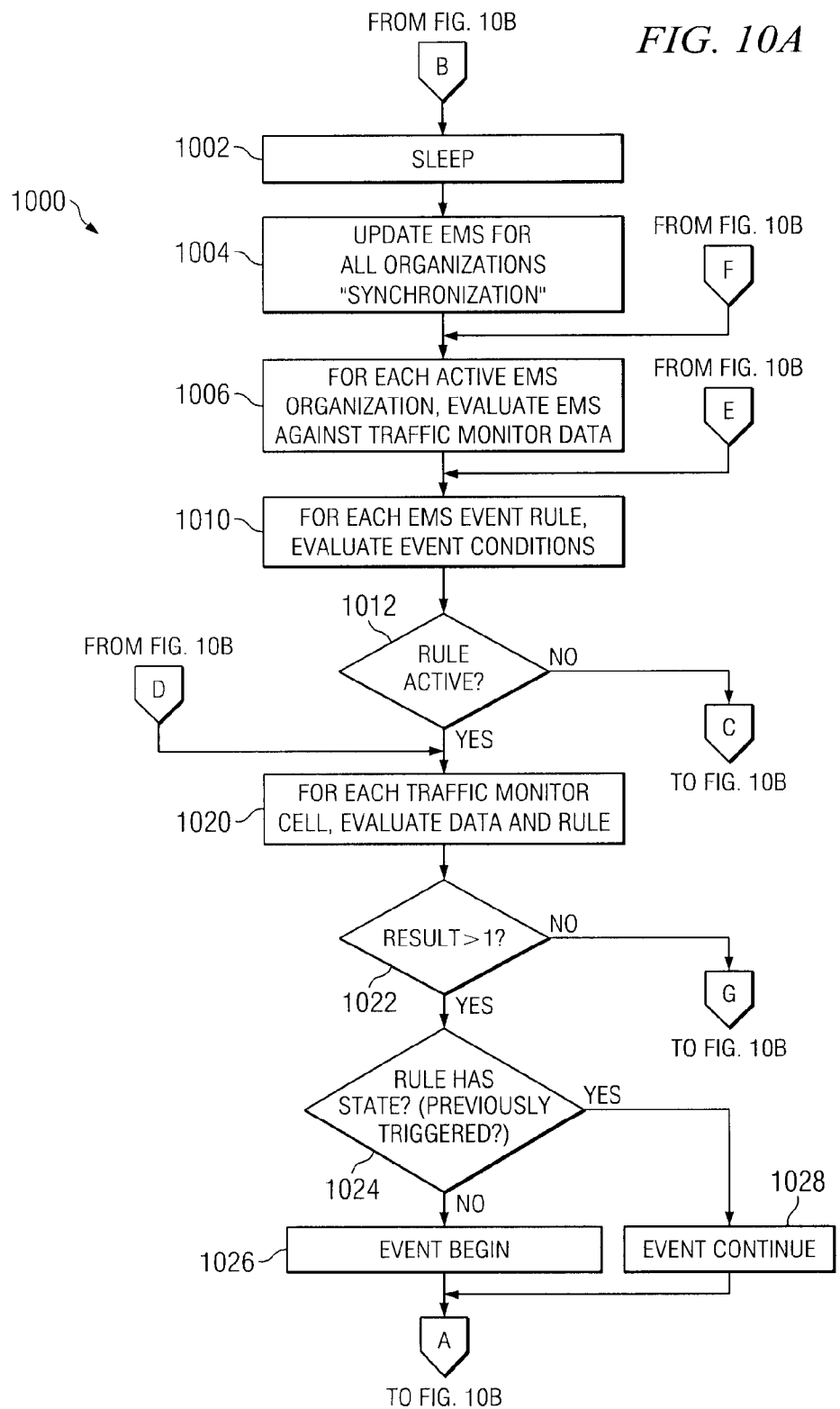
FIG. 10 is a flowchart illustrating the process flow for the Interpreter process resource within an EMS.
Figure 10B:
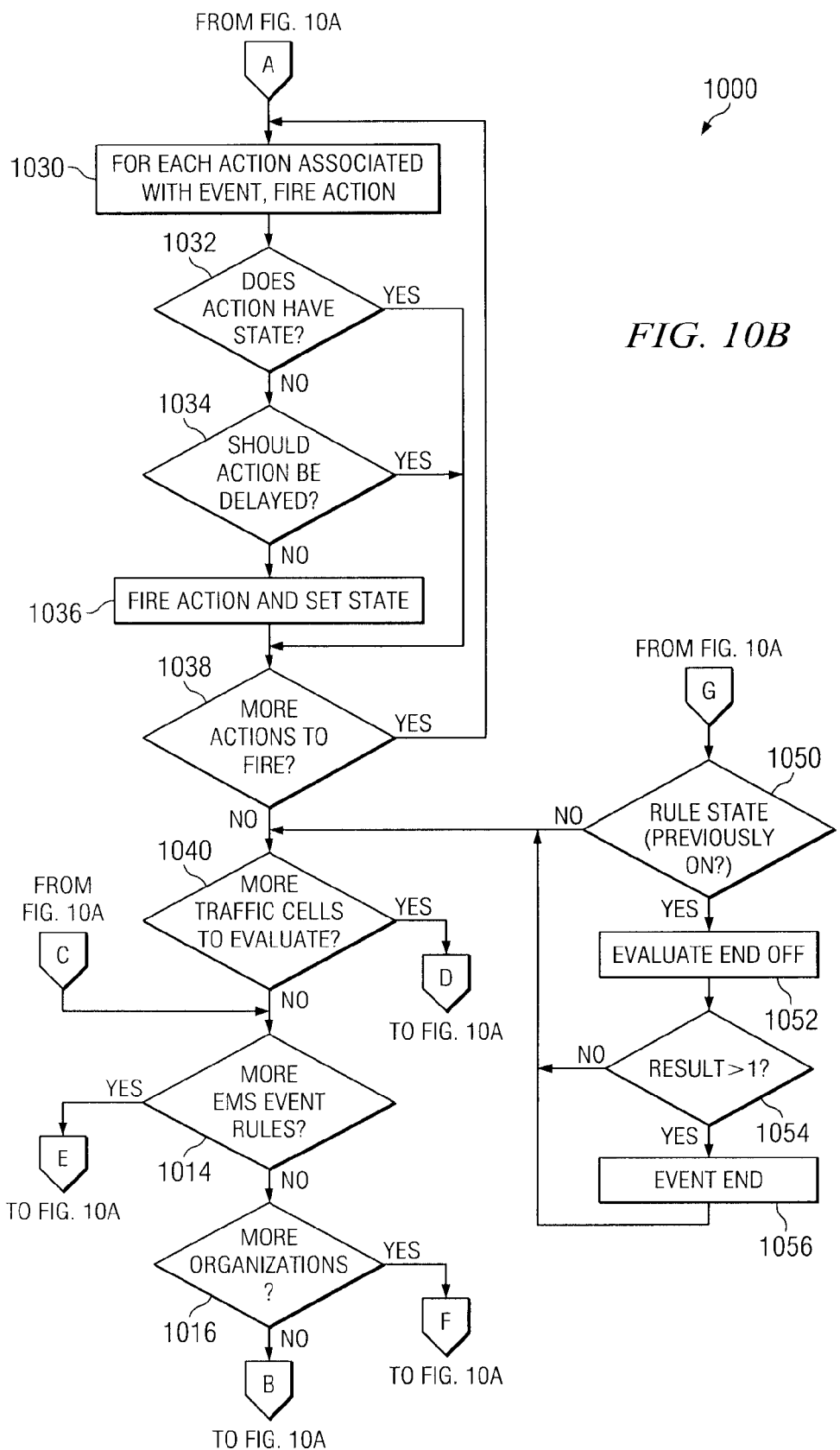

Looking now at FIG. 10, illustrated is an operational flow diagram 1000 of the interpreter process 350, which was also generally described in the text accompanying FIGS. 3-4. Execution of the process flow for the interpreter process 350 begins at step 1002, which is the sleep state for the process. After a certain period of time, e.g., fifteen seconds, execution of the program flow moves to step 1004. At step 1004, the EMS 203 configuration is updated for all the organizations for which the EMS 203 is responsible. This process may be referred to as "synchronization." At step 1006, the interpreter process 350 begins to analyze the traffic events occurring for each organization identified in step 1004. As a part of this action, the EMS 203 evaluates the traffic events occurring as reflected in the data stored in the traffic monitor 340.

The process flow continues at step 1010, where the EMS 203 evaluates the event conditions for the particular EMS 203 event rule for the organization under consideration. At decision step 1012, the interpreter process 350 software queries whether the particular rule is an active one. If the rule is not active, the process flow goes to decision step 1014, whereupon the software module queries whether there are more EMS 203 event rules to be processed for the particular organization. If there are no further EMS 203 event rules for the particular organization, the process flow proceeds to decision step 1016, at which the software module queries whether there are additional EMS 203 organizations for which the EMS 203 events should be processed. If there are no additional EMS 203 organizations to process, the software module returns operation to the sleep mode at step 1002, which was the beginning of this process flow. If, however, there are additional EMS 203 organizations having EMS 203 event rules to be processed, then operation would return to step 1006, at which the software module will again begin the process of evaluating the EMS 203 traffic against the EMS 203 event rules for this other organization.

Again at step 1010, the event conditions are evaluated against each EMS 203 event rule. If, in this case, at decision step 1012 the rule is active, the software flow would proceed to step 1020. At step 1020, the interpreter process 350 evaluates each traffic cell, where a traffic cell is a single connection between a source and a destination, and is represented in the traffic monitor 340 by a single cell in the data table 504. At decision step 1022, if a positive result of the evaluation of the particular traffic cell at step 1020 is positive ("result greater than one"), then execution of the interpreter process 350 algorithm continues to decision step 1024. At decision step 1024, the rule state is evaluated to see whether it has previously been triggered. If it has not, at step 1026, the event execution is begun. If the rule state has already been triggered, then execution of the event will continue at step 1028. In either case operation continues at step 1030, at which time a process is begun for "firing" the actions that are associated with particular event states.

At decision step 1032, the interpreter process 350 queries whether that particular action associated with the event already has a state associated with it in the process execution. If no, the interpreter process 350 then queries whether the particular action should be delayed at decision step 1034. If the action should not be delayed, at step 1036, the particular action is "fired" and a state is set indicating the activation of that action. Next, at decision step 1038, the interpreter process 350 queries whether there are additional actions to fire. If so, execution returns to step 1030; in this loop, steps 1030 to 1039 continue until all actions associated with a particular event have been processed. Once there are no more actions to "fire" at step 1038, execution proceeds to decision step 1040, whereupon the interpreter process 350 software examines whether there are more traffic cells to be evaluated. If there are additional traffic cells to evaluate, the process returns to step 1020. If there are no more traffic cells to evaluate, the process returns to decision step 1014, at which it is determined whether there are additional EMS 203 rules to be processed. Based on this decision, the process can continue at previously described steps 1010 or 1016.

Again evaluating the traffic cells at step 1020, if there is not a positive result at decision step 1022, the process proceeds to step 1050, at which the interpreter process 350 queries whether the particular rule state was previously ON. If not, there is no particular action to take with respect to this rule state, and the processing of traffic cells can continue at decision step 1040. If, however, the rule state had previously been ON, but is now OFF, which is the situation indicated by a positive result at decision step 1050, then the process proceeds to step 1052 to evaluate the ending procedures for that particular rule state. If a positive result occurs at decision step 1054, then the event end for the particular rule state is processed at step 1056. If, however, there is not an end process to execute as indicated by a negative result at decision step 1054, then the algorithm of the interpreter process 350 will continue to process additional traffic cells through decision step 1040 and its subsequent branches.

Figure 11:
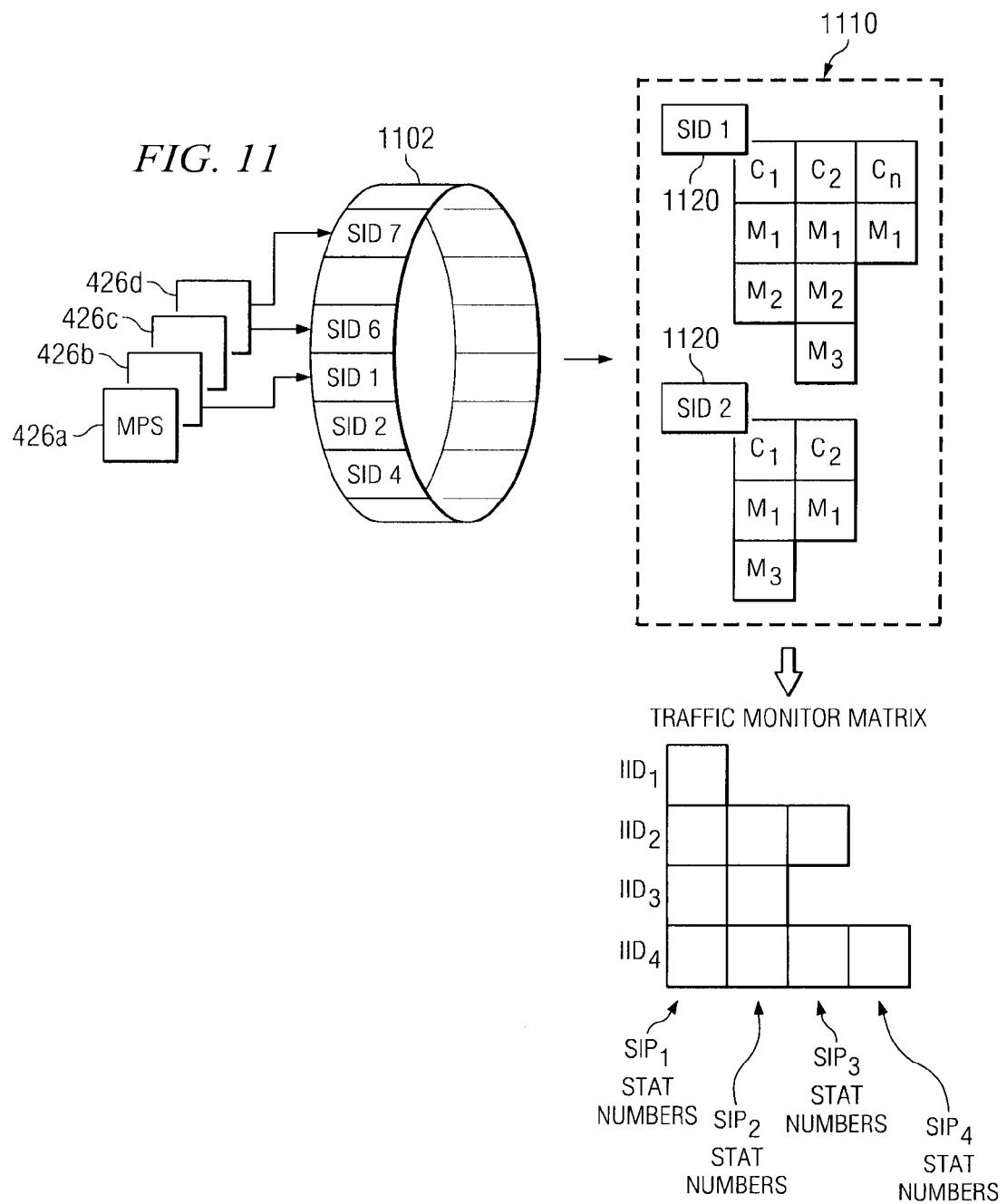
FIG. 11 graphically illustrates data structures that can be employed in the described embodiments for real-time traffic monitoring.

Now looking at FIG. 11, illustrated are data structures that can be employed in an embodiment of the EMS 203 for the real-time monitoring of traffic in the traffic monitor 340. As was shown in FIG. 5, in some embodiments, multiple message handling computer processes 320*a*, 320*b* are employed, whereby multiple connections to a single traffic monitor 340 and interpreter process 350 are processed in parallel. FIG. 11 shows the MPSs 426*a*-426*d* of multiple such computer processes 320*a*, 320*b* connected to a single ring buffer 1102, which ultimately provides data in this embodiment for a single traffic monitor. The MPSs 426*a*-426*d* send their data to the ring buffer 1102 in small, asynchronous blocks of data. The data may be tagged with a time and a session ID in each instance. For example, each block of data might be tagged with a header, "SID8, 00:02," which would indicate that the session ID is session number 8, and the time for the receipt of the data is 00:02. The session IDs and times shown in this example are merely examples, and session IDs into the hundreds or thousands could be used. In addition, time indicators as precise as thousandths of a second or less could also be used.

The ring buffer 1102 holds all the data generated by the connection managers 322, delivery managers 324, MPSs 426*a*-426*d*, and, in this example, it sorts the data in SID order, which reduces searching overhead during insertion into a later intermediary format and may also provide efficiency when storing data into the ring buffer 1102. From the ring buffer 1102, the traffic monitoring data is then stored into an intermediary data structure 1110. In this intermediary data structure 1110, the data is placed into groups 1120 associated with the session IDs, where the groups 1120 have records for each connection (C1, C2 . . . CN), and for each message (M1, M2, M3 . . . ) sent over each connection. This data is continually updated with new data from the ring buffer 1102, and it is continually refreshed when the data is older than the data stored in the actual traffic monitor data matrix 1130.

The structure of the data matrix 1130 is only an exemplary format for the traffic monitor data matrix 1130, and is maintained for access by the interpreter process 350. Use of the intermediary data structure 1110 allows for a more compact traffic monitor data matrix 1130, which can be structured so as to have no empty cells. The data matrix 1130 is arranged with different IIDs (destinations) populating different rows and with differing Source IPS (SIPs, or sources) as the differing columns within each row. By individually structuring each row with independent column entries for the SIPs, it is possible to build this data table or matrix 1130 as shown in FIG. 11, with no empty cells. Then, within each cell, different statistics can be provided, and the interpreter process 350 will be able to recognize certain activity based on the information stored in those cells.

It may be desirable for both the interpreter process 350 and other resources to have access to the traffic monitor data matrix 1130. At least two different mechanisms can be provided to allow access to the contents of the data matrix 1130—direct and polled. Through direct access, the interpreter process 350 can lock up a given cell of the data matrix 1130 to read that cell's data in real time. Through polled access, a process can be provided for multiple resources to request access to data in the data matrix 1130 via a network. The data matrix 1130, or a process associated with the data matrix 1130, can arbitrate the requests, and at certain periods can lock the requested data in the data matrix 1130, and access and send that data to the requesting resources. The data can be requested as raw data, summary data, or it can be requested by a customer mailhost.

Thus, the presently described system has the ability to map in a data matrix, in real time, all incoming requests and requested destinations, all relevant message parameters (spam, virus, recipients, connection time, data size, destination server return code, etc), as well as to monitor the connection/destination matrix in real time for any number of recipient email addresses or mail servers across multiple customers, and to immediately initiate action automatically based on a real-time monitoring of the state of the traffic monitor data matrix 1130. Other system abilities possessed in the described embodiments include the ability to recognize, in real time, all SMTP connections that are being originated in order to request a connection to a recipient mail system, and not just necessarily a single server. The described EMS is also able to use matrix data from one customer/recipient to modify actions for another. For example, if the EMS recognizes a "spammer" based on its actions towards one customer group, the EMS is also able to prevent spam from that source from reaching other destinations.

Thus, the EMS described herein can handle, filter, and monitor, and react against, in real time, many incoming connections. The EMS is also operable, however, to tune the delivery of messages to a destination mail server based on the loading in that server or on other conditions. It can balance loads among multiple destination servers, spool outgoing messages to destination servers in a controlled manner, and conditionally deliver messages to destination servers based on different conditions.

Figure 12:
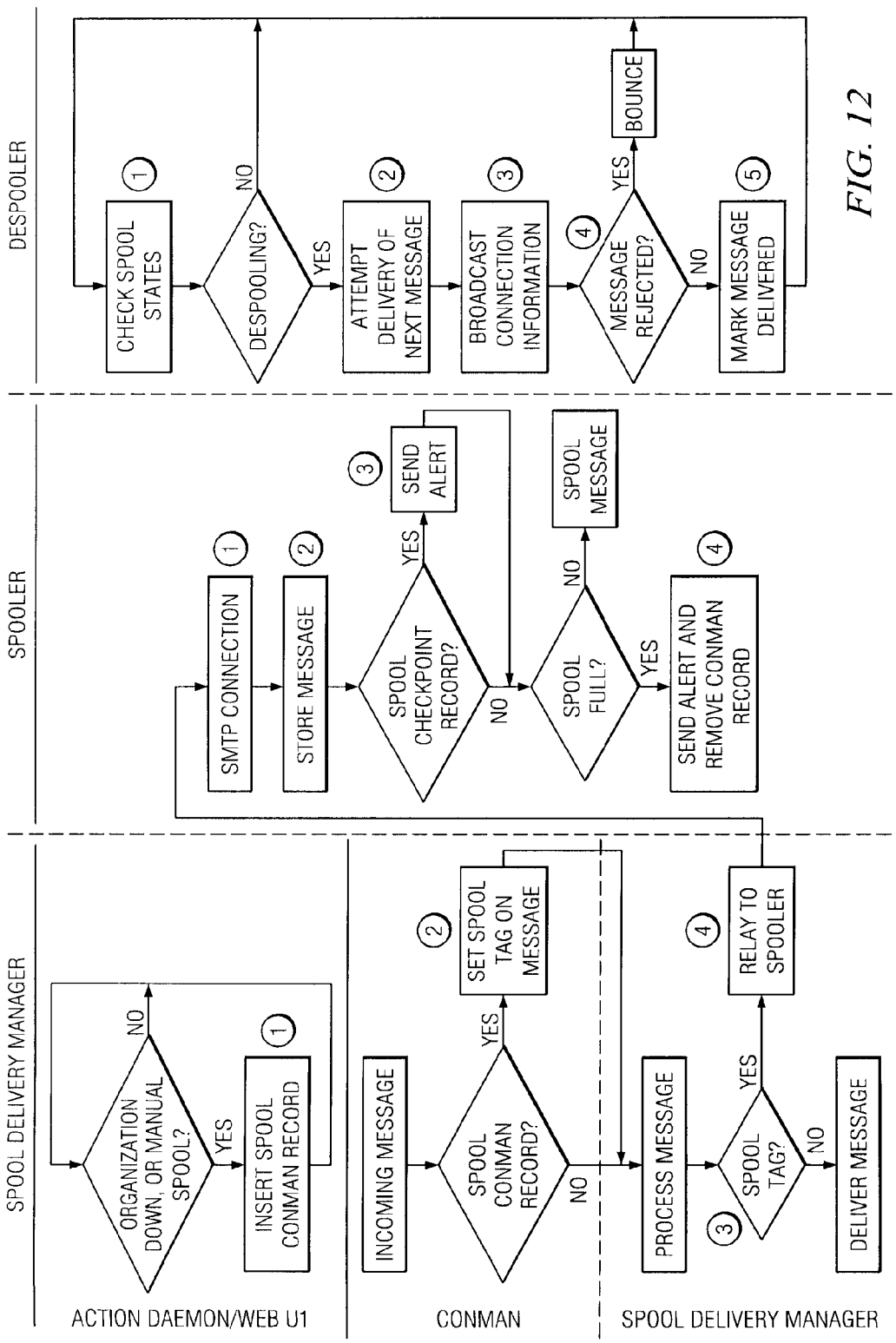
FIG. 12 is a flowchart illustrating the process flow for a Spool Delivery resource for the described embodiments.

Looking next at FIG. 12, illustrated is a spool manager comprising three MPSs, as described below. The Spool Delivery Manager is invoked by an MPS plug-in that runs on the message handling computer process of the EMS, and works in harmony with the connection manager to determine whether or not messages should be spooled. With reference to FIG. 12, the Spool Delivery Manager functions as follows:

1) To initiate spooling, a SPOOL connection management record must be inserted for an organization, either manually through the UI or automatically by the interpreter process, if it detects the organization mail server is unreachable.
2) The connection manager assigns a SPOOL tag to each message sent to an organization for which there exists a SPOOL connection management record in the conman table.
3) The Spool Delivery Manager examines each incoming message for a "Spool" tag.
4) If a Spool tag exists for a message, the Spool Delivery Manager blocks the message from being delivered, and instead relays the message to a spool server using the Spooler.

The Spooler is a modified MPS application running on the spool server that accepts messages from the Spool Delivery Manager, and stores them in a spool repository. With reference to FIG. 12, the Spooler functions as follows:

1) The Spooler waits for an SMTP connection request from the Spool Delivery Manager.
2) Each incoming SMTP command, including the raw message data, is stored in the organization's (i.e., recipient's) spool repository.
3) If the spool size reaches one of several predefined spool size checkpoints (e.g. 75% of capacity), an alert notification is generated.
4) If after storing the message, the spool size exceeds the maximum allocated spool size for the organization, an alert notification is generated, and the spool connection management record is removed, preventing subsequent messages from being spooled.
5) If a spool tag exists for a message, the Spool Delivery Manager blocks the message from being delivered, and instead relays the message to the spool server using an SMTP connection.

The Despooler is also a modified MPS application running on the spool server that accepts messages from the Spool Delivery Manager, and stores them in a spool repository. To this end, the Despooler functions as follows:

1) The Despooler waits for an SMTP connection request from the Spool Delivery Manager.
2) Each incoming SMTP command, including the raw message data, is stored in the traffic monitor.
3) Spool Delivery Manager in order to maintain proper connection limiting to the organization.
4) If the message is rejected by the organization, the Despooler will bounce the message to the original sender.
5) If a message is successfully delivered, it is tagged "delivered" in the spool repository.

Steps 2-5 are repeated until all messages in the spool repository have been delivered.

Figure 13:
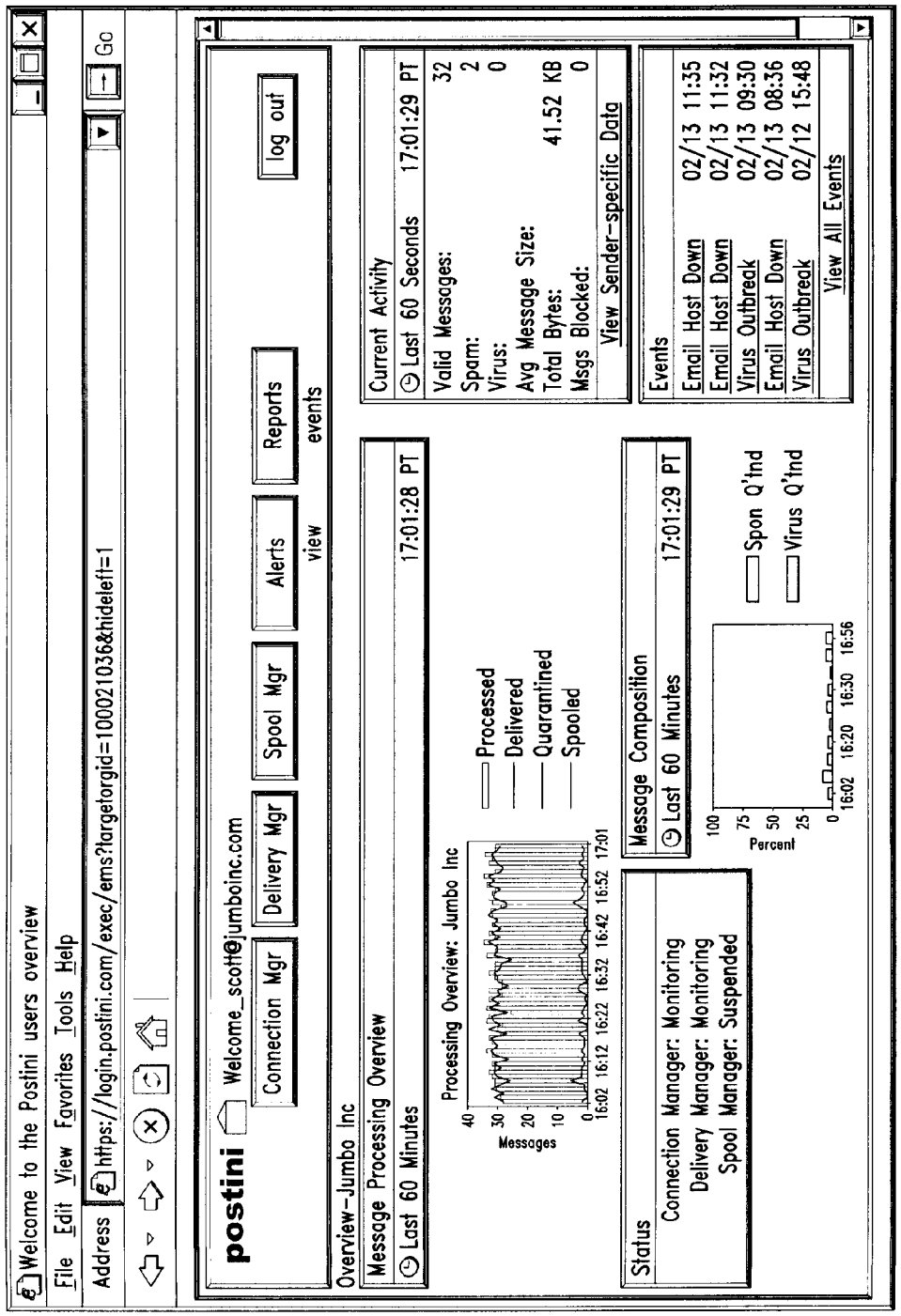
FIG. 13 is a screen shot of an example access page for an administrative console for use with an EMS according to the present invention.

Referring now to FIG. 13, illustrated is a screen shot 1300 of an example access page for an administrative console for use with an EMS according to the present invention. As shown from the access page is available to users and/or system administrators for monitoring of statistics and alarms occurring in their electronic messaging networks. In addition, the access page may be employed by users and/or system administrators for the configuration of rules employed by the EMS to manage the transmission of electronic messages. The particular access page shown here includes multiple access tabs, including "Connection Mgr", "Delivery Mgr", "Spool Mgr", "Alerts" and "Reports". In addition to accessing these individual components of the EMS, the access page in FIG. 13 provides status of the individual components, as well as an overview of the flow of electronic messages into the system.

Figure 14:
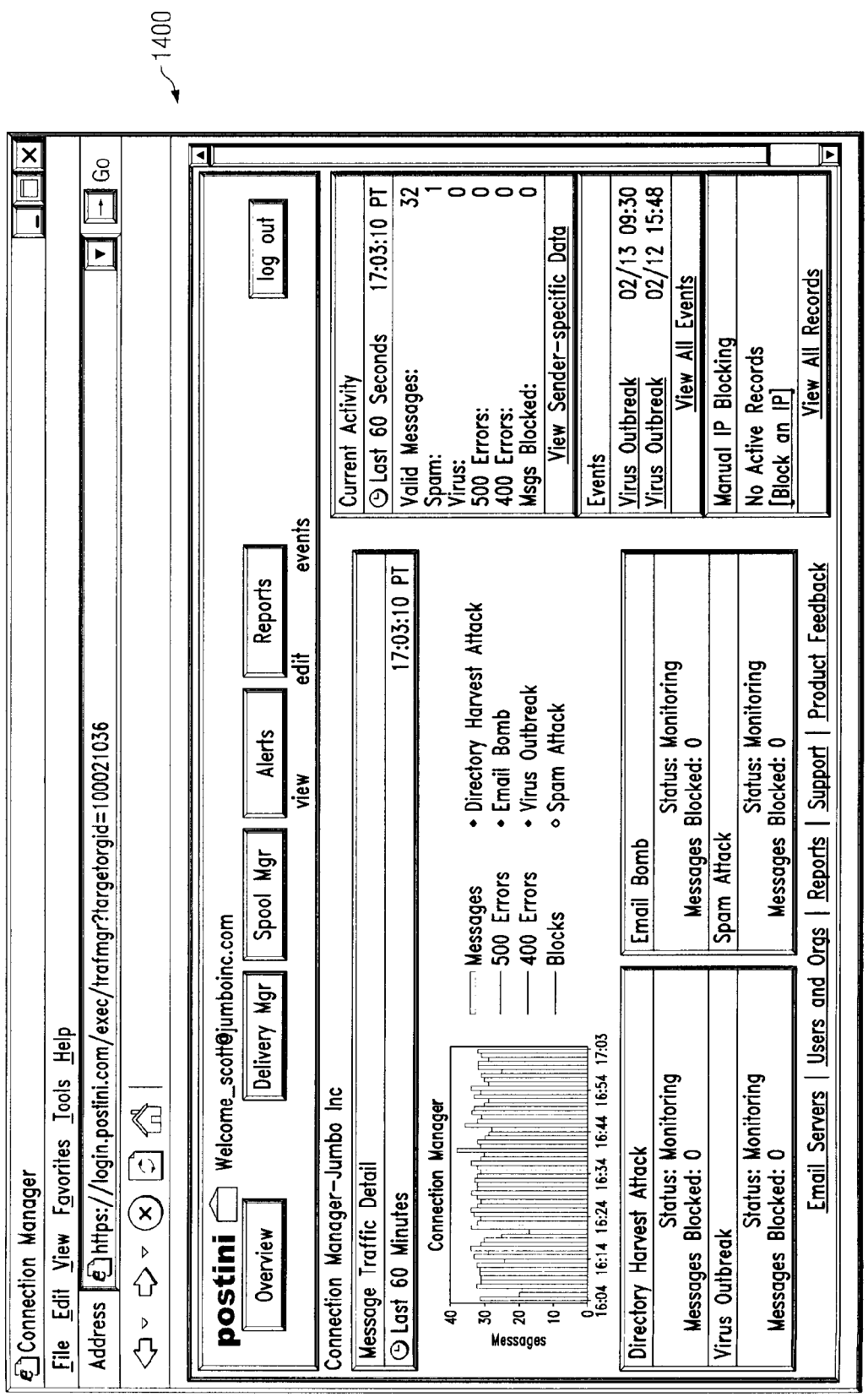
FIG. 14 is a screen shot of an example page for monitoring and configuring a connection manager used in an EMS according to the present invention.

Turning briefly to FIG. 14, illustrated is a screen shot 1400 of an example page for monitoring and configuring a connection manager used in an EMS according to the present invention. As shown, this access page displays the status of the connection manager in an EMS, as well as providing statistics of particular transmission violations that have occurred. Although the particular offending activities illustrated are only directory harvest attacks, virus outbreaks, e-mail bombs and spam attacks, the access page may be configured to illustrated statistics of other types of offending behaviors without limitation.

Figure 15:
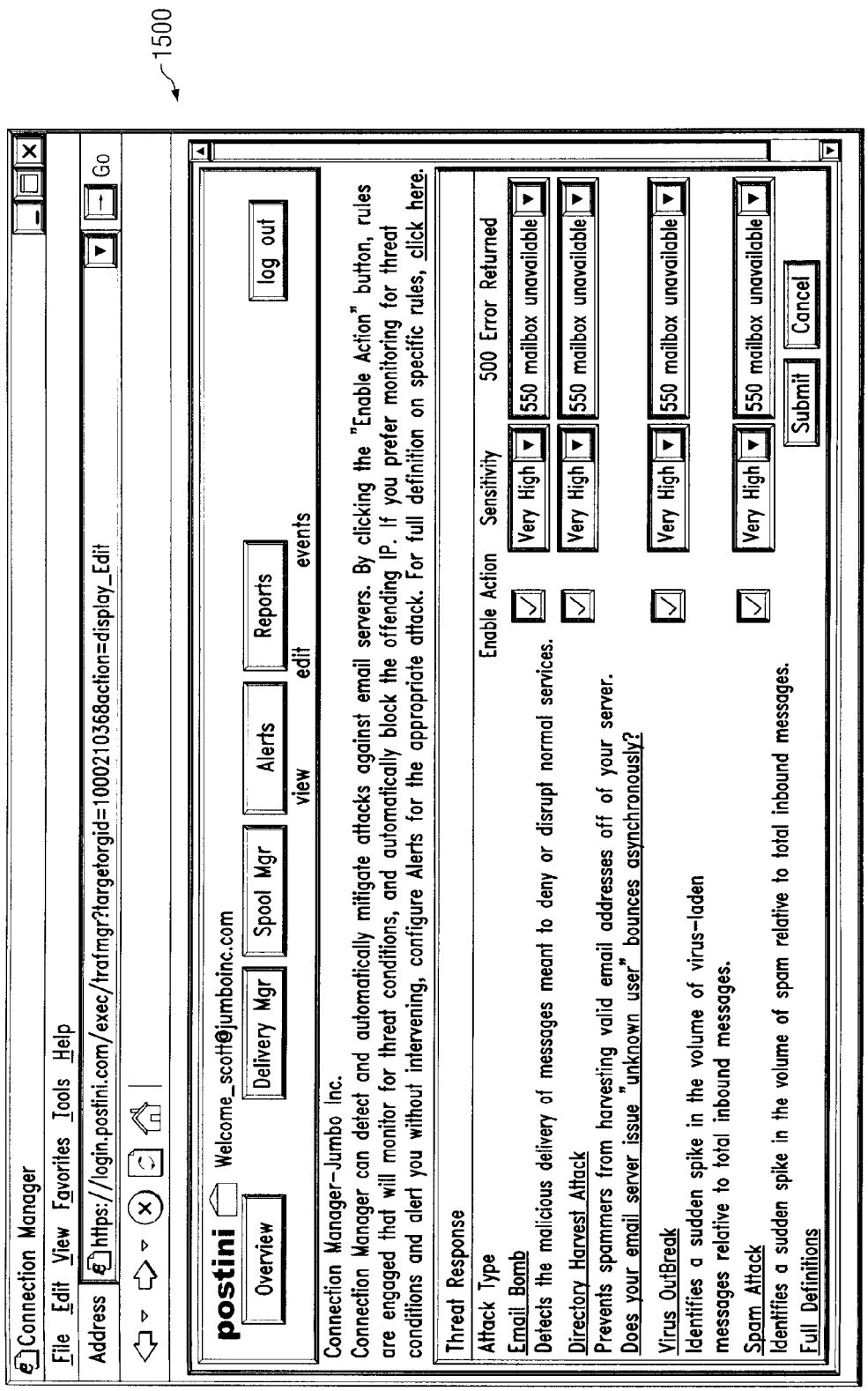
FIG. 15 is a screen shot of another example page for a connection manager used in an EMS.

FIG. 15 is a screen shot 1500 of another example access page for a connection manager used in an EMS of the present invention. As shown, this access page provides definitions for specific offending actions of incoming electronic messages to assist users in configuring the EMS as their needs arise. In addition, this access page also includes various detection and prevention selections, allowing users a broader range of choices for the management of their incoming electronic messages.

Figure 16:
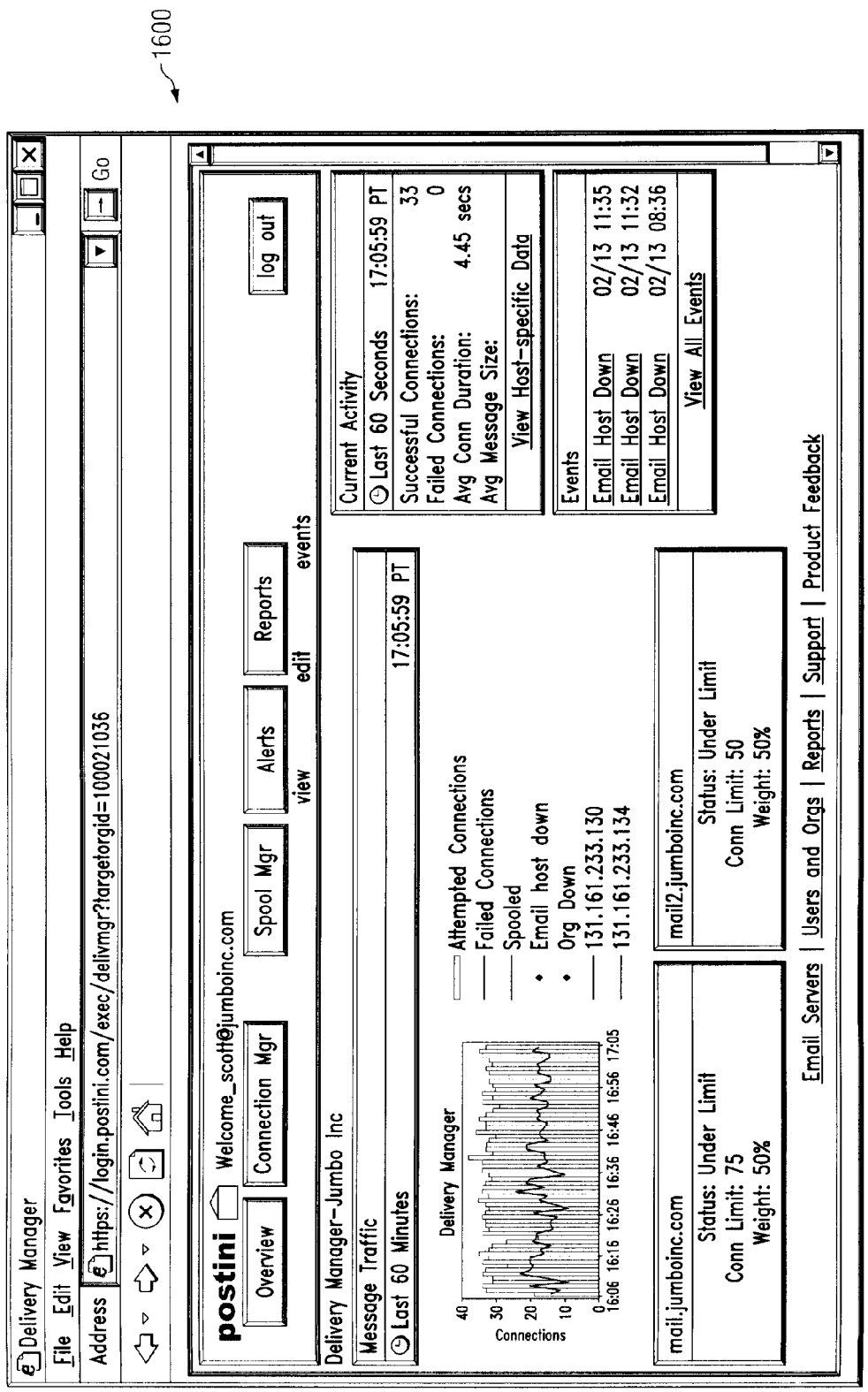
FIG. 16 is a screen shot of an example page for monitoring and configuring a delivery manager used in an EMS according to the present invention.

Looking at FIG. 16, illustrated is a screen shot 1600 of an example page for monitoring and configuring a delivery manager used in an EMS according to the present invention. This access page displays the status of the delivery manager in an EMS, as well as providing statistics of particular delivery (or non-delivery) actions taken by the EMS in response to offending activities of incoming messages. In addition, this access page allows users to monitor the status of distinct destination servers, for example, to determine the free capacity of such destination servers.

Figure 17:
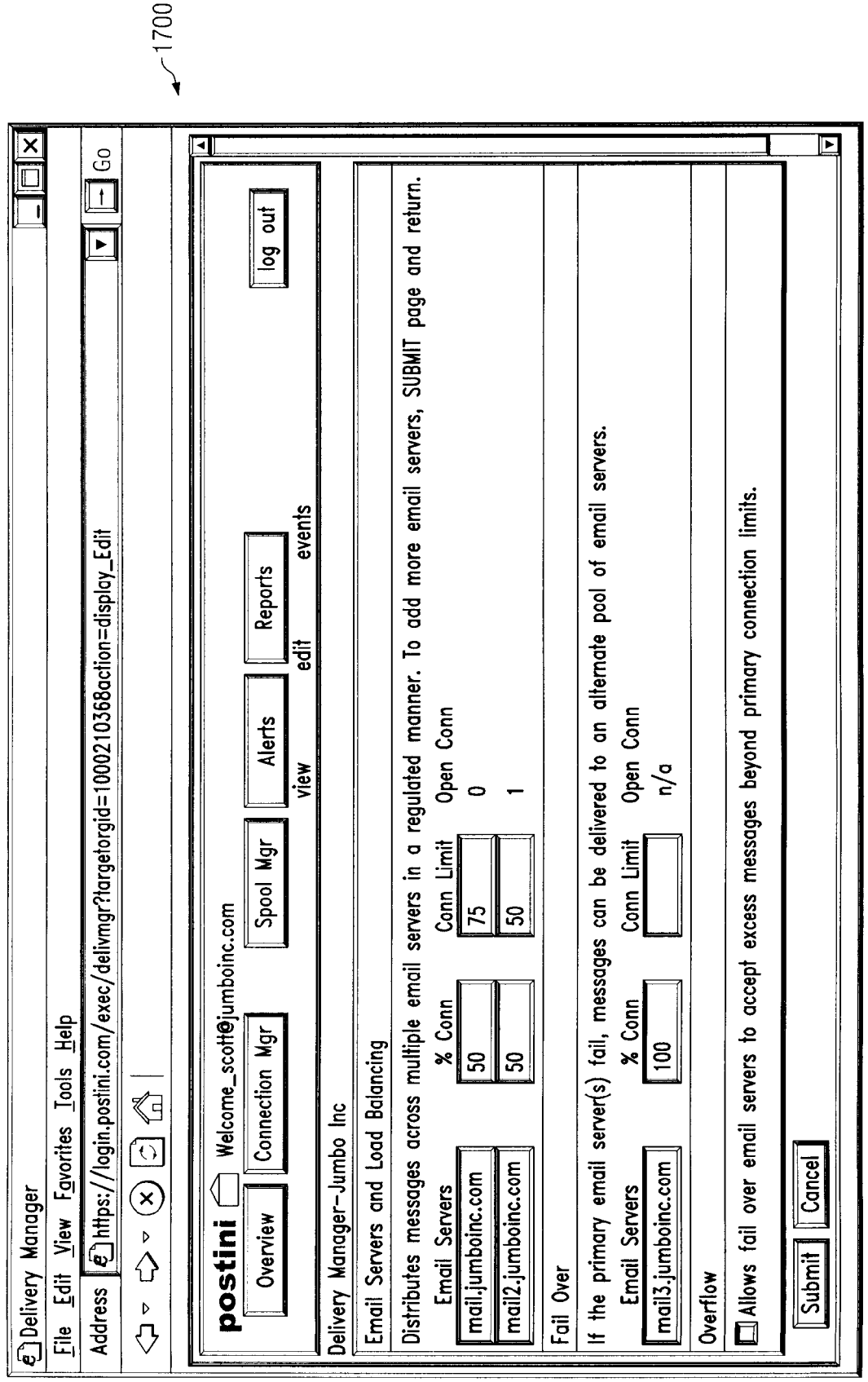
FIG. 17 is a screen shot of another example page for a delivery manager used in an EMS.

Turning finally to FIG. 17, illustrated is a screen shot of another example page for a delivery manager used in an EMS. As shown, this access page allows the user to configure specific details of the individual destination servers shown in FIG. 16. Configuration parameters that may be altered through this access page include connection capacities, as well as adding new destination servers to the EMS to enjoy the protection provided by the present invention.

While various embodiments of an EMS constructed according to the principles disclosed herein, as well as specific components of the EMS, have been described above, it should be understood that they have been presented by way of example only, and not limitation. Thus, the breadth and scope of the invention should not be limited by any of the above-described exemplary embodiments, but should be defined only in accordance with the following claims and their equivalents.

What is claimed is:

1. A system for managing delivery of electronic messages from sending mail servers to destination mail servers, wherein the system comprises:

a computer-processor-implemented message management server, wherein the message management server is configurable to:

intercept at least one of the electronic messages from a sending mail server to a destination mail server;

extract a source address and content from the electronic message; and automatically determine in real-time an action to take on the electronic message based on an examination of metadata associated with the source addresses of other electronic messages intercepted by the message management server and based on the analysis of metadata and the content of the electronic message, wherein the determination can be made, at least in part without reference to a promulgated database of spam or viruses associated with unwanted electronic messages; wherein the message management server is configurable to automatically update its rules regarding disposition of subsequent intercepted electronic message based in part on the determination of the electronic message.

2. A system according to claim 1, wherein the message management server is located on a first network and the destination mail server is located on a second network, wherein the first network is different from the second network.

3. A system according to claim 1, wherein the message management server is configurable to delay delivery of the electronic message.

4. A system according to claim 1, wherein the message management server is configurable to automatically identify spam and viruses in real-time based on data obtained from a plurality of electronic messages intercepted by the message management system.

5. A system according to claim 1, wherein the determination is made prior to writing the electronic message to disk.

6. A system according to claim 1, wherein the source address is an IP address.

7. A system according to claim 1, wherein the extraction and determination do not delay the delivery of the electronic message if the electronic message is wanted.

8. A system according to claim 1, wherein the action to take is selected from the group consisting of:
message accept; message quarantine; message spool; message throttle; black hole; message deliver; message defer; message reject; and message redirect.

9. A system according to claim 1, wherein the message management server is configurable to establish an SMTP connection between the sending mail server and the destination mail server.

10. A system according to claim 1, wherein the message management server is configurable to determine if the electronic message is unwanted.

11. A system according to claim 1, wherein the message management server is configurable to:
extract a destination address of the electronic message; and automatically determine in real-time an action to take on the electronic message based on an examination of metadata associated with the destination address of other electronic messages intercepted by the message management system.

12. A system according to claim 1, wherein the message management server is configurable to derive metadata comprising a count of the number of spam messages sent from a sending mail server.

13. A system according to claim 1, wherein the message management server is configurable to examine the message content and determine that the electronic message contains a virus.

14. A system according to claim 1, wherein the promulgated database stores signatures of viruses and spam associated with unwanted messages.

15. A method for managing delivery of electronic messages from sending mail servers to destination mail servers, the method comprising:
intercepting, at a computer-processor-implemented message management system, at least one of the electronic messages from a sending mail server to a destination mail server; extracting a source address and content from the electronic message; and automatically determining in real-time an action to take on the electronic message based on an examination of metadata associated with the source addresses of other electronic messages intercepted by the message management system and based on the analysis of the metadata and content of the electronic message, wherein the determination can be made, at least in part without reference to a promulgated database of spam or viruses associated with unwanted electronic messages; further comprising automatically updating rules regarding disposition of subsequent intercepted electronic message based in part on the determination of the electronic message.

16. A method according to claim 15, wherein the message management system is located on a first network and the destination mail server is located on a second network, wherein the first network is different from the second network.

17. A method according to claim 15, further comprising delaying delivery of the electronic message.

18. A method according to claim 15, further comprising automatically identifying spam and viruses in real-time based on data obtained from a plurality of electronic messages intercepted by the message management system.

19. A method according to claim 15, wherein the determination is made prior to writing the electronic message to disk.

20. A method according to claim 15, wherein the source address is an IP address.

21. A method according to claim 15, wherein the extraction and determination do not delay the delivery of the electronic message if the electronic message is wanted.

22. A method according to claim 15, wherein the action to take is selected from the group consisting of:
message accept; message quarantine; message spool; message throttle; black hole; message deliver; message defer; message reject; and message redirect.

23. A method according to claim 15, further comprising establishing an SMTP connection between the sending mail server and the destination mail server.

24. A method according to claim 15, further comprising determining if the electronic message is unwanted.

25. A method according to claim 15, further comprising:
extracting a destination address of the electronic message; and automatically determining in real-time an action to take on the electronic message based on an examination of metadata associated with the destination address of other electronic messages intercepted by the message management system.

26. A method according to claim 15, further comprising deriving metadata comprising a count of the number of spam messages sent from a sending mail server.

27. A method according to claim 15, further comprising examining the message content and determine that the electronic message contains a virus.

28. A method according to claim 15, the promulgated database stores signatures of viruses and spam associated with unwanted messages.

* * * * *